US006009420A

United States Patent [19]

Fagg, III et al.

[11] Patent Number: 6,009,420

[45] **Date of Patent: *Dec. 28, 1999**

[54] COMPUTER-IMPLEMENTED DECISION MANAGEMENT SYSTEM WITH DYNAMICALLY GENERATED QUESTIONS AND ANSWER CHOICES

[75] Inventors: Fred D. Fagg, III, Lake Oswego, Oreg.; Peter D. Bergsman, Palo Alto, Calif.

[73] Assignee: Expert Systems Publishing Co., Lake Oswego, Oreg.

[ * ] Notice: This patent is subject to a terminal disclaimer.

[21] Appl. No.: 08/946,738

[22] Filed: Oct. 7, 1997

Related U.S. Application Data

[62] Division of application No. 08/377,489, Jan. 24, 1995, abandoned, which is a continuation of application No. 07/957,508, Oct. 5, 1992, abandoned.

[51] Int. Cl.[6] ...................... G06F 15/18

[52] U.S. Cl. ...................... 706/45

[58] Field of Search ...................... 706/45, 11; 364/513, 364/188

[56] References Cited

U.S. PATENT DOCUMENTS

| | | | |
|---|---|---|---|
| 4,318,184 | 3/1982 | Millett et al. | 706/45 |
| 4,591,983 | 5/1986 | Bennett et al. | 706/61 |
| 4,648,044 | 3/1987 | Hardy et al. | 706/60 |
| 4,649,515 | 3/1987 | Thompson et al. | 706/45 |
| 4,658,370 | 4/1987 | Erman et al. | 706/45 |
| 4,675,829 | 6/1987 | Clemenson | 706/50 |
| 4,763,277 | 8/1988 | Ashford et al. | 706/60 |
| 4,837,689 | 6/1989 | Tanaka et al. | 704/8 |
| 4,860,214 | 8/1989 | Matsuda et al. | 706/52 |
| 4,891,766 | 1/1990 | Derr et al. | 706/45 |
| 5,084,819 | 1/1992 | Dewey et al. | 434/262 |
| 5,208,745 | 5/1993 | Quentin et al. | 364/188 |
| 5,239,617 | 8/1993 | Gardner et al. | 706/11 |
| 5,319,740 | 6/1994 | Yamada et al. | 706/59 |
| 5,333,237 | 7/1994 | Stefanopoulos et al. | 706/11 |
| 5,347,614 | 9/1994 | Yamada et al. | 706/59 |
| 5,379,057 | 1/1995 | Clough et al. | 345/173 |
| 5,539,869 | 7/1996 | Spoto et al. | 345/336 |
| 5,542,024 | 7/1996 | Balint et al. | 395/356 |
| 5,596,752 | 1/1997 | Knudsen et al. | 395/701 |

OTHER PUBLICATIONS

The Automated Law Office: Software Tools for Document Assembly by James A. Eidelman, pp. 1–11, The Lawyer's PC, Jul. 15, 1989.

Document Assembly Software, Part Two: Programs in Progress and Integrated Software Functions by James A. Eidelman, pp. 1–10, The Lawyer's PC, Aug. 1, 1989.

Silicon Epics and Binary Bards: Determining the Proper Scope of Copyright Protection for Computer Programs, UCLA Law Review, 1987, pp. 1493, 1494, 1495, 1497.

(List continued on next page.)

*Primary Examiner*—Thomas G. Black
*Assistant Examiner*—Sanjiv Shah
*Attorney, Agent, or Firm*—Klarquist Sparkman Campbell Leigh & Whinston, LLP

[57] ABSTRACT

A system for assisting a user in making decisions on a task through the asking of questions about the task and providing answer choices to the questions for the user. The system includes a set of question procedures which include a reference to another procedure and also answer procedures which include references to other procedures. Questions are dynamically generated by executing a question procedure which, in turn, calls a referenced procedure to generate a result based on one or more previous answers by the user. The referenced procedure passes the result to the question procedure for use in generating the question. The same process is used for dynamically generating answer choices for the questions. The referenced procedures may include, among others things, fetches of previous answers, conditional statements that choose among possible results based on a previous answer, or references to still other procedures. With this system, the questions and answers are kept current as the user moves through them. Advice for the questions and answer choices may also be dynamically generated.

20 Claims, 17 Drawing Sheets

OTHER PUBLICATIONS

Expertext Automated Expertise, (published prior to application filing date), 7 pages.
TitleExpert: Searching for Tomorrow, by Doug Simpson, Canadian Document Assembly Report, Jan. 1990, pp. 1–4.
DEC's Expert Systems Plans in Manufacturing Support, by Tom Schwartz, Knowledge Engineering, Feb. 1987, pp. 1–16.
Introducing the "Expert" System for Document Assembly, Scrivener, (published prior to application filing date), 4 pages.
This morning's work: The old way. The new way., by Capsoft Development Corporation, (published prior to application filing date), 5 pages.
Dr. Donald A. Waterman, Expert Systems, May 1987, pp. 73–87.
Document Modeler, Lawyers Co–op, 1990, 6 pages.
Selling Expertise Off the Rack, Business Week/Nov. 6, 1989, pp. 188D and 188H.
Investor finds his thrill in Knowledge Point, by Doug Millison, Industry, (published prior to application filing date), 2 pages.
Economic Trends, by Gene Koretz, Business Week/Nov. 6, 1989, p. 34.
Expert Systems Take Off, Infoworld, Apr. 24, 1989, pp. 41, 44, 46, and 47.
Managing Future Thought, HBS Bulletin, Feb. 1989, cover pages and pp. 32–35.
Knowledge–Based Expert Systems Come of Age, BYTE Publications Inc., Sep. 1981, pp. 238, 240, 242, 246, 248, 254, 255, 258, 259, 260, 262, 264, 266, 268, 270, 272, 274, 276, 278, 280, and 281.
Legal Blanks & Forms Catalog #90, Stevens–Ness Law Publishing Co., Revised Apr., 1990, front cover, price list, pp. 1–20, list of dealers, back cover.
Programming Gets Personal by Maxem, (published prior to application filing date), 6 pages.
Work Form, Feb. 1990, Work Notes, Nov./Dec. 1989, Work Tool, Analytic Legal Programs, Inc., 22 pages.
Letter from Ann Seltz, Analytic Legal Programs, Inc., dated Oct. 15, 1989, to Peter Bergsmann, with attachments, 29 pages.
Automating the Legal Reasoning Process: A Computer That Uses Regulations and Statutes to Draft Legal Documents, by James A. Sprowl, American Bar Foundation Research Journal 1979:1, pp. 3–81.
Actor Gives Windows Programmers a Hand by Stephen Cummings, PC Week, Oct. 27, 1987, 2 pages.
High–Tech Cut–and–Paste, by Linda and James Pierce, California Lawyer, Jan. 1991, pp. 53 and 54.
Expert Systems in the Real World by Martha Freeman, California Lawyer, May 1989, pp. 83 and 84.
Expert systems can automate decisions by Ken Dellinger and Gregory Shipp, The Business Journal/Computers, Sep. 17, 1990, p. 27.
Lawyers Explore Options In Documents Assembly and Expert Systems, by Page Lane Smith, Technology (published prior to application filing date), pp. 4 through 6.
Attorney adapts form generator for Illinois laws, by Tripp Baltz (published prior to application filing date), one page.
Breaking Through Tech Support's Chinese Wall, by Dave Trowbridge, Computer Technology Review, vol. XI, No. 7 (published prior to application filing date), 2 pages.
With New Planning Software, Entrepreneurs Act Like M.B.A.s, by William M. Bulkeley, The Wall Street Journal, Jun. 2, 1992, 2 pages.
Easier Drafting With CAPS Document Assembly, by Barry Bayer and Benjamin Cohen, The Recorder, Jan. 2, 1992, pp. 8 and 9.
Using Document Assembly Techniques in Your Business Practice, by Robert Payne, Jr., The Business Lawyer Update, Nov./Dec. 1991, pp. 12 and 13.
Before The Rush, by Suzanne Pickgrobe, Oregon State Bar Bulletin, Dec. 1991, pp. 29 through 31.
No Risk in Repeating Yourself, By Joseph Hustein, California Lawyer, Dec. 1991, pp. 49 through 52.
Borrowing A Tool From Business School, by Diane Goldner, reprinted from American Lawyer, Jul./Aug. 1986, 3 pages.
The Future, by Brenton R. Schlender, Fortune, Aug. 26, 1991, pp. 40 through 44, 48, 50, and 54.
Software Programs Proliferate, by James A. Eidelman, The National Law Journal, Mar. 5, 1990, pp. 17 through 32.
sEpFeFcEiCaTIS, Fall Catalog 1989, Maxem, 30 pages.
Keening a Competitive Edge, Jon Klemens, ABA Journal (Nov. 1, 1988, p. 114).
Drafting in the Personal Computer Age, Laura Lou Meadows, Legal Economics (Jul./Aug., 1986).
Work Notes, Analytic Legal Programs, Inc. (Jun./Jul., 1991).
Work Notes, Analytic Legal Programs, Inc. (Sep./Oct., 1990).
Work Notes, Analytic Legal Programs, Inc. (May/Jun., 1990).
Work Notes, Analytic Legal Programs, Inc. (Nov./Dec., 1989).
Work Notes, Analytic Legal Programs, Inc. (Sep., 1989).
Work Notes, Analytic Legal Programs, Inc. (Jun./Jul., 1989).
Bringing Software to the Front Office, Karen Dillon, The American Lawyer (Sep., 1988, p. 131).
Letter to Peter Bergsmann, Esq. from Ann Seltz with enclosures, Analytic Legal Programs, Inc. (Oct. 25, 1989).
Analytic Debuts Workform 3, Analytic Legal Programs, Inc.
Press Release, Analytic Legal Programs, Inc. (Feb., 1992).
Workform 3: What's New, Analytic Legal Programs, Inc.
Permutations: Background, Eric C. Little, Analytic Legal Programs, Inc.
Pehlivanidis et al., A knowledge based expert system for pavement condition evaluation, VTT symposium, pp. 337–352, Jun. 28, 1990.
Sprowl et al., ABF: A system for automating document compilation, AFIPS conference proceeding, pp. 711–717, Jun. 18, 1987.
Workform, automated document assembly program, marketed by analytic legal program Inc., pp. 1–20, Dec. 1989.

COMPUTER-IMPLEMENTED DECISION MANAGEMENT SYSTEM WITH DYNAMICALLY GENERATED QUESTIONS AND ANSWER CHOICES

This is a division, of application Ser. No. 08/377,489, filed Jan. 24, 1995, abandoned which is a continuation of application Ser. No. 07/957,508, filed Oct. 5, 1992, now abandoned.

BACKGROUND OF THE INVENTION

This invention relates to computer-based systems that use a question-and-answer format and/or complete a user task such as preparing a legal opinion, assembling a document, rendering a medical diagnosis, or conducting educational training and evaluation sessions. More particularly, this invention relates to a system that assists the user in exercising professional judgment in the course of completing a task, rather than the system itself merely making decisions based on user input. By A permitting the user to exercise intellectual control over decisions made in the process of completing the task, by efficiently informing the user about the professional judgment required, and by assisting in the timely exercise of that judgment, the system effectively combines the knowledge base of a computer system with the expertise and experience of the user. The system combines: (1) an execution component (herein called the "execution program") with (2) a task-specific component (herein called "application programs") to accomplish tasks for the user, and includes (3) an application authoring component (herein called the "authoring program") for the generation of "application programs" that may be used in conjunction with the "execution program" to accomplish their assigned tasks for the user. The system allows for the creation and use of concise application programs that solicit preliminary factual input from the user. It then manages the process of coupling that factual input with the application author's expertise embedded within applications, and, together with the user's judgment (effectively informed and obtained during execution by the system), swiftly and economically performs the assigned task.

Computer-based decision making systems, often known as expert systems, provide advice or opinion based on facts entered into the system by the user. If the user's task, for example, is to diagnose a medical condition, the system prompts the user for pertinent information. It then renders an opinion based on the facts provided by the user and the knowledge base (usually a set of rules) of the system. Such expert systems have been used in a variety of fields, including the preparation of legal documents such as contracts, licenses, etc. These particular systems are commonly known as expert-based document assembly systems.

Such prior systems (particularly document assembly systems) have suffered from a number of drawbacks that have limited their usefulness. One drawback is the lack of available application programs (also known as packages) for users. Application programs may either be written directly using a programming language such as C or may be created using another computer program known as an authoring program. Typically, authors that can provide the expertise for an application, such as experienced lawyers, scientists and medical doctors, are not skilled computer programmers. Authoring programs attempt to simplify the writing of application programs so that their authors can write application programs with minimal training. However, prior authoring programs have often been too complex to be useful, and as a result few applications have been written. The application programs that must be authored using prior systems necessarily are complex structures themselves—requiring substantial computer programming skill of their authors to deal with a multitude of ordinary aspects of computer implementation.

Another drawback of such prior systems has been their deterministic nature. As described above, such systems prompt a user for facts and then apply a series of rules to determine appropriate answers. In terms of preparing a document, these answers represent provisions that are included in the document. The user is not given the opportunity to exercise professional judgment as to the desirability of a provision. For example, a provision in an employment contract may or may not be desirable, depending on subtleties not available to the system. Only the user, experienced in evaluating the subtleties and well informed as to their implication, can make the ultimate decision whether to include such a provision, and yet present systems neither well inform the user nor allow for such user judgment. The result is that the document provided by the system must often be heavily edited, and hence the value of the system to the user is considerably less than hoped.

This invention overcomes these drawbacks. It provides an authoring program that is simple to use for preparing application programs. This invention's application programs may be very concise structures not requiring their authors to be concerned with the ordinary aspects of other computer implementation. It also allows the professional judgment of the user to be combined with the knowledge base of the system in completing the task at hand, whether that task is providing a medical diagnosis, a training session, a professional opinion or an assembled legal document.

SUMMARY OF THE INVENTION

An object of the invention, therefore, is to provide a simple, easy-to-use authoring program for writing applications for a computer-assisted decision management advice system such as a document assembly system.

Another object of the invention is to provide such an authoring tool that simplifies the design of applications so that an application may be easily reviewed for improvement or for errors.

Yet another object of the invention is to provide a decision management system that permits and assists a user to exercise informed judgment in the completion of the task rather than just provide facts in answering questions posed by the system.

Yet another object of the invention is to provide a decision management system that "learns" from answers provided by a user in creating follow-up questions and advice.

To achieve these objects, a novel computer-based method for assisting a user in making decisions in the process of completing a task is shown and described herein. The system has wide applicability including training, education, diagnosis, etc. The method of the invention includes providing a set of questions for completing the task, asking the user a first question from the set, and providing a choice of answers to the first question for the user and advice from the system's knowledge base for deciding which of the answers to the first question to select. The choice of answer, however, remains under the control of the user, who can exercise professional judgment based on prior knowledge and advice provided by the decision management system.

The method proceeds with asking the user following questions such as a second question from the question set.

The second question is determined in part by the user's answer to the first question. For example, the second question may need to make reference to a fact the user has supplied in answer to the first question. Or the question selected, by the system may change depending on the user's first answer. Whatever the effect of the first answer, the user is then provided a choice of answers to the second question, with one or more of the answers determined in part by the user's answer to the first question. The user is also provided advice for assistance in choosing an answer to the second question, the advice also determined in part by the user's answer to the first question.

The method then continues as described, with following questions, answers and advice influenced by the user's previous answers. Throughout the decision-making process, the user retains control of the answers if so desired, with the system providing advice from its knowledge base for assistance in answering a question.

Although a decision management system according to the invention has many uses, it is particularly suited for document assembly. That is, the system allows an experienced lawyer or other professional to determine what provisions are suitable for a document such as a contract or license. This determination is based on the facts provided by the lawyer, judgments made by the lawyer while using the system, and the legal knowledge base of the system. Ultimately the lawyer chooses provisions based on professional judgment with the assistance of the system. A document can be assembled with the invention much faster and more efficiently than with traditional methods of researching the legal effects and cross effects of various provisions.

This decision management system also includes a novel authoring program for preparing applications. Using an intuitive program block approach and index, an author can construct an application by placing questions, answer, choices, advice and provisions in program blocks each uniquely identified by name. The author then arranges and assembles these blocks to build an application program. The logic of the application is simple to review, allowing efficient editing and error-checking. Authors do not need prior computer training to use the authoring program. Hence, persons with the desired expertise in fields such as law, education and medicine can readily write applications for the decision management system.

The foregoing and other objects, features, and advantages of the invention will become more apparent from the following detailed description of a preferred embodiment which proceeds with reference to the accompanying drawings.

DETAILED DESCRIPTION

A. Overview of the Decision Management System

Figure 1:
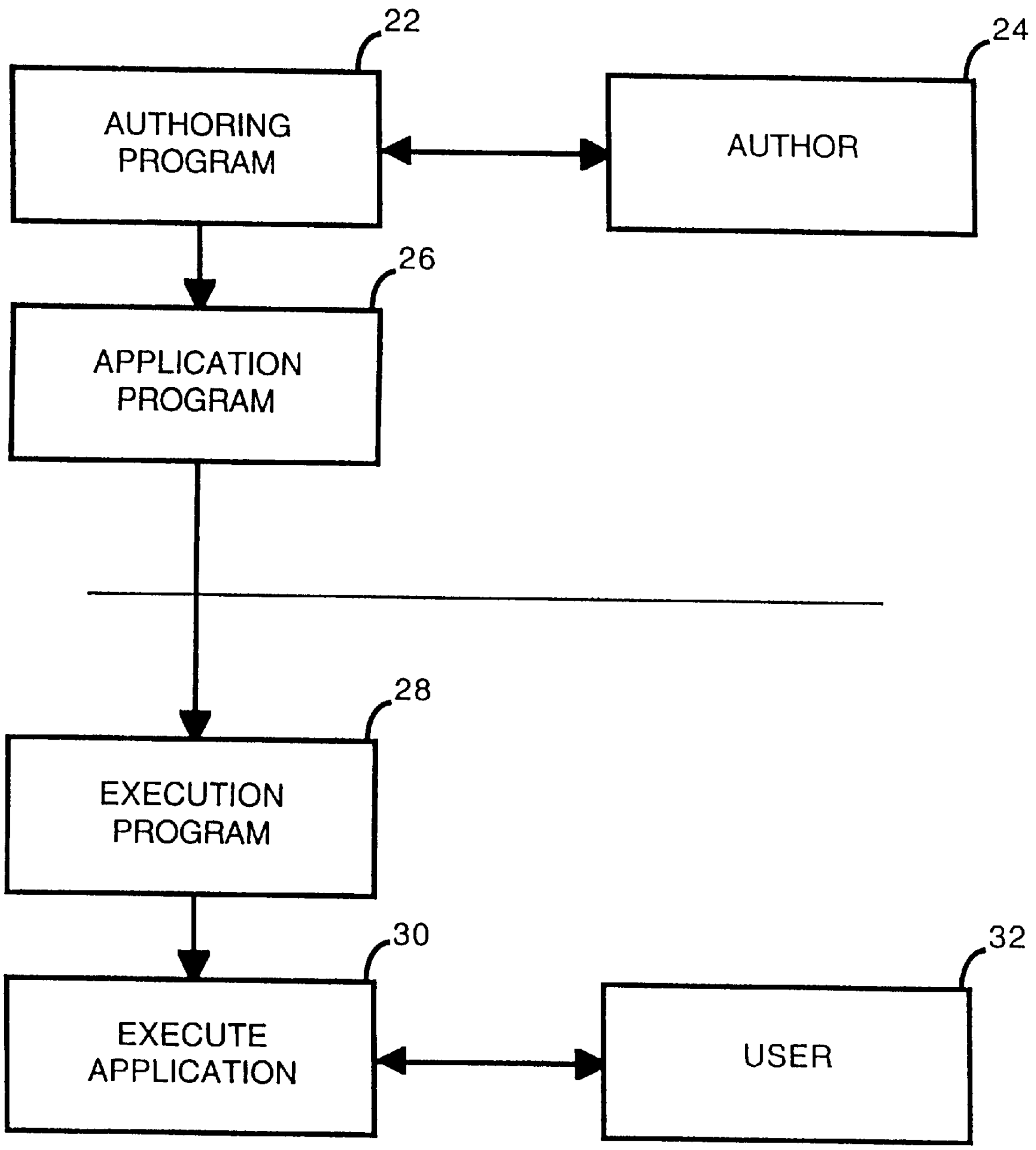
FIG. 1 is a block diagram of the overall software architecture of a decision management system according to the invention.

A computer-assisted decision management system according to the invention includes three major components. Referring to FIG. 1, one component of the system is an authoring program 22 that an author 24 uses for preparing a second component, an application program 26. These application programs can cover any number of subjects, such as education of students, training of workers, the assembly of a legal document or the rendering of a medical diagnosis. For assisting in understanding the invention, reference may be made to a document assembly program as a preferred embodiment, although it will be understood by those skilled in the art that the invention may be used in any number of fields such as mentioned above. A third component of the decision management system is an execution program 28 that executes or runs the application 30 for interaction with a user 32.

1. The Authoring Program and Application Programs

Figure 2:
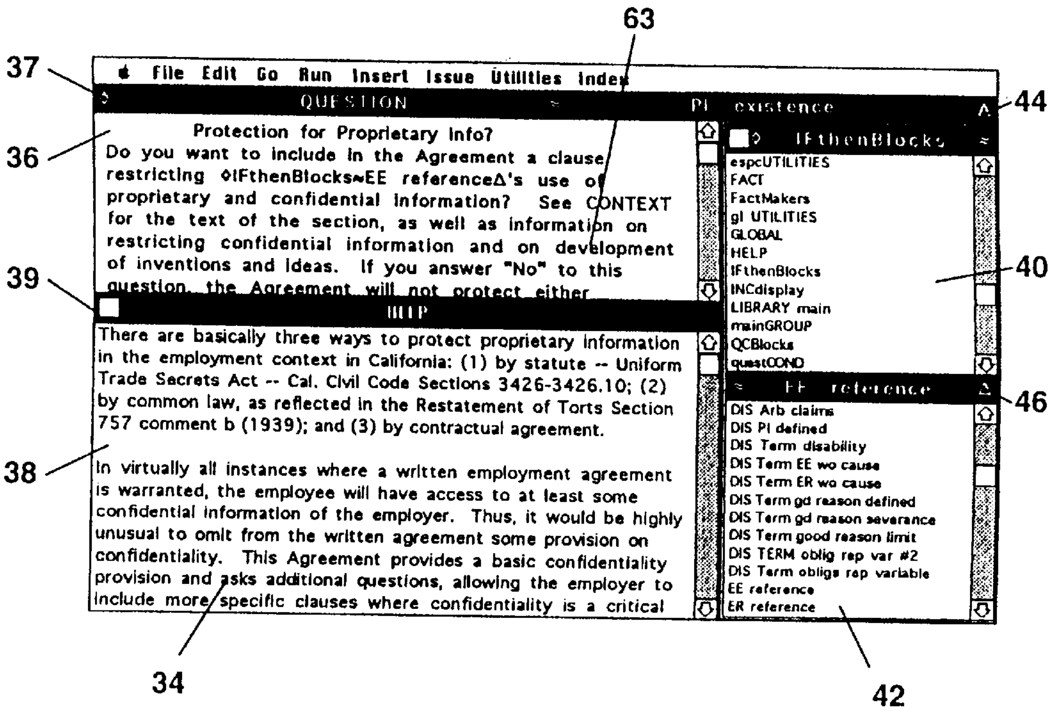
FIG. 2 is a screen display of a user interface used in an authoring program of the decision management system for writing application programs.

FIG. 2 is a preferred embodiment of the visual interface 34 provided by the authoring program 22. Although any number of interfaces are possible, the interface 34 is preferred because it has proven to be simple for non-computer experts to learn and use to prepare application programs 26. Shown within the interface are several windows that display various data. Window 36 and window 38 comprise workspaces in which blocks of the application 26 under development may be displayed and edited. The authoring program 22, as will be explained in detail below, places data including text, block references and conditional statements into application program blocks such as a question block displayed in window 36 and a help block containing advice explaining the question in window 38. The names of the blocks open in windows 36 and 38 are highlighted in bars 37 and 39, respectively. Similarly, other types of program blocks can be created such as answer blocks that contain possible answers to questions and context blocks that explain the import of each answer. The workspace environment is quite versatile and allows multiple windows to be open simultaneously.

The program blocks created for a particular application are accessible through an index shown in windows 40 and 42. The index lists the names of the program blocks on the display for selection by the user, for adding new program blocks, for opening a block for editing in the workspace or for entry of a reference to an indexed block into an open block. The blocks in an index are organized into block groups (shown in window 40) and blocks within a currently selected group (shown in window 42). The name of the currently selected block group is highlighted in bar 44, and the name of the currently selected block is highlighted in bar 46.

For example, the question block in FIG. 2 contains a reference to a program block EE Reference shown in the index. Whatever name is currently in the EE Reference block will be shown in the question when it is asked. The user will supply the EE name for the block in response to an earlier question from the application program prompting for the name.

The author thus writes an application program by creating appropriate program blocks, naming them and then selecting and assembling such blocks from the index in a desired order. Such selection includes selecting a conditional statement (such as an If-Then-Else statement) for insertion into a program block. The conditional statement is constructed to accept a reference to another block as a condition for evaluation.

A detailed software description of the authoring program 22 is provided in section B, below. However, it will be understood by those skilled in the art that the application programs 26 generated by authoring program 22 or its method, as claimed, are not restricted to use solely with the execution program 28. Nor is the execution program 28 or its method, as claimed, restricted to use with the applications generated solely by the authoring program 22.

2. The Execution Program and Application Programs

Figure 3:
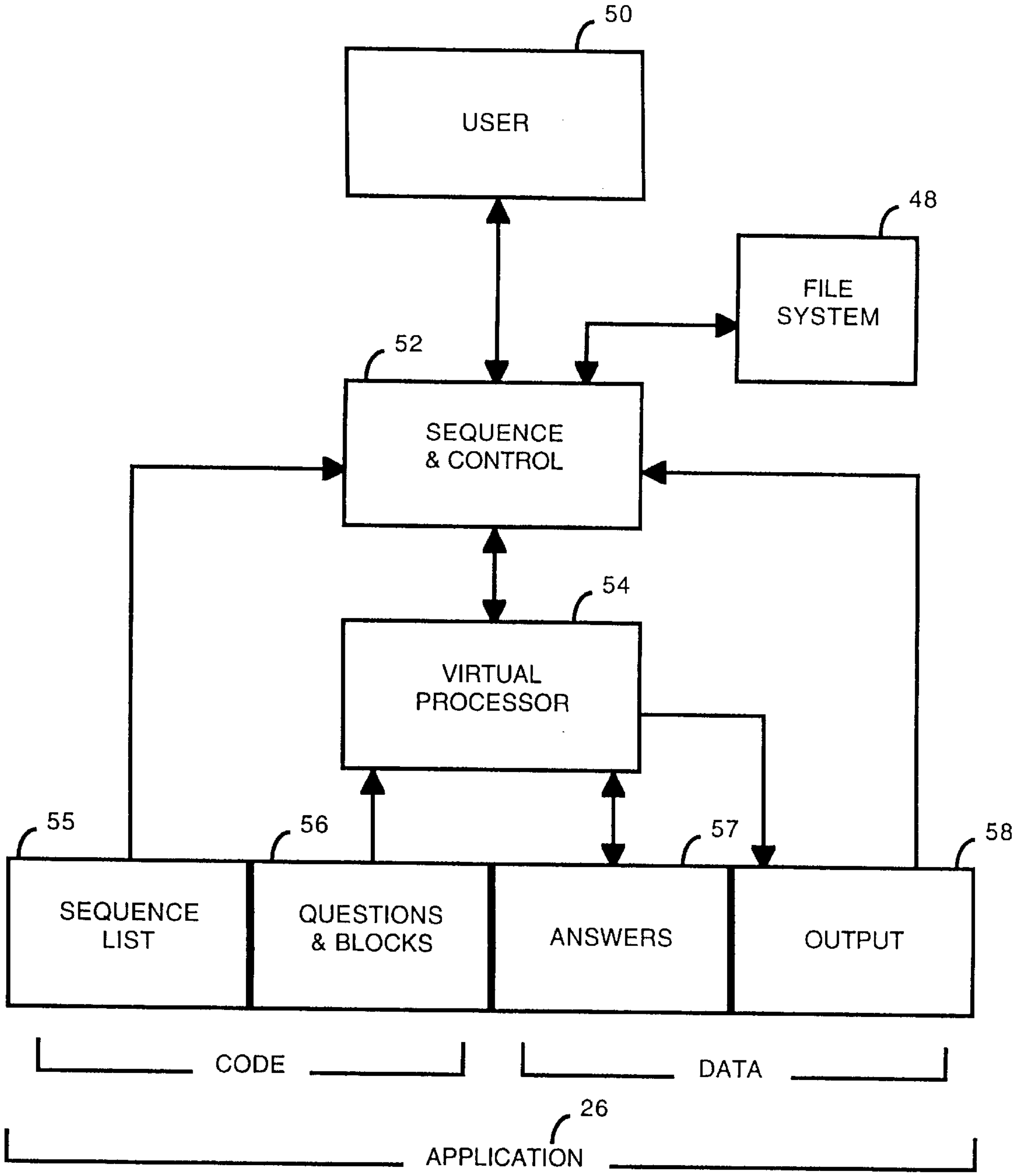
FIG. 3 is a block diagram of the software architecture of an execution program of the decision management system for executing application programs.

FIG. 3 is a block diagram of the software architecture of the other portion of the decision management system, the execution program 28. The program 28 runs on a host computer platform such as a microcomputer and is stored in a file system 48 within the computer. Through a question-and-answer dialogue managed by the program 28, a user 50 controls the overall operation of the execution program 28 and execution of the application program 26.

The execution program comprises two main components: a sequence and control module 52 and a virtual processor module 54. The control module 52 manages the dialogue with the user 50 through various functions. These functions include managing the display of application output and the sequence in which application questions are asked of the user 50. These functions further include managing the storage and retrieval of files to and from the file system 48, and the scheduling of the application program's executable components on the virtual processor module 54.

The virtual processor module 54 then executes the executable components of the application program 26, manages answers and other dynamic data employed in the execution and accumulates the output of the execution for interaction with the user.

The application program 26 within the host platform is illustrated in FIG. 3 as a series of functional components. The components include a sequence list component 55, a questions & blocks component 56, an answers component 57 and an output component 58. Components 55 and 56 are executable code in the application program 26. Answer component 57 and output component 58 store data generated as a result of such execution. Components 55 and 56 are static data structures which are loaded from the application program when the application is executed. The execution program then creates dynamic data structures required for the application's execution, including answers component 57 for storing data entered by user 50 and output component 58 for storing output data.

The execution program 28 thus is a computer-based method for assisting a user in making decisions in the process of completing a task defined by the application program 26. In summary, in the process of executing the application program 26, the execution program 28 provides a set of questions for completing the task at hand. The user is asked a first question from the set as the execution program 28 provides a choice of answers to the first question for the user. The execution program also provides advice to the user for deciding which of the answers to the first question to select. This advice may take the form of help or context program blocks that can be accessed by user commands for explaining the meaning or consequence of a question or answer.

The user's answer to the first question is recorded and a following, second question is asked from the question set. The content of the second question is determined at least in part by the user's answer to the first question. The execution program 28 responds by providing a choice of answers to the second question, one or more of the answers determined at least in part by the user's answer to the first question. The execution program 28 also provides advice to the user for deciding which of the answers to the second question to select, the advice determined at least in part by the user's answer to the first question. The second answer is also recorded. The above process is then repeated with other questions in the question set until all questions material to completing the task are asked and answered. A detailed description of the operation of the execution program is provided in part C of the patent.

To accelerate operation of the execution program, it is often desirable to ask the questions in the question set in a predetermined order. This ensures that a question is not asked until all conditions precedent to that question are met. For example, in FIG. 2, the question requires the name of the employee. Thus a question asking the employee's name would first be asked in executing the application so that the name is available to this question when it is asked.

In the preferred embodiment, the questions are asked and the answers and advice are provided by displaying them on a computer display. However, they may also be asked in any,number of ways, such as with audio or printing devices.

The application program may also be set so that questions are asked in the execution program only if conditions precedent to the asking of the question have been met. If such conditions have not been met, then the question is not asked unless invoked by the user directly or required by follow-on logic.

In the preferred embodiment, the act of determining the second question from the user's answer to the first question comprises incorporating information from the answer into the second question.

Only material questions in the question set need to be asked. Whether a question is material is determined from one or more answers already given by the user to previously-asked questions. In some cases, these answers make the asking of the following question unnecessary or irrelevant.

The execution program can provide a suggested response if the user fails to answer a question. The suggested response may then be adopted by the user as the answer. Alternatively, the execution program may require a user-provided answer to a question before proceeding with further questions.

In the context of a document assembly system, the questions in the question set seek facts or determine provisions for inclusion into a document. The method proceeds as described above, with the answers representing facts or provisions for inclusion into the document, such as shown in FIG. 2. The advice in such a system takes the form of explaining the significance of including an answer representing a provision into the document.

B. Detailed Description of the Authoring Program and Application Programs

Figure 4:
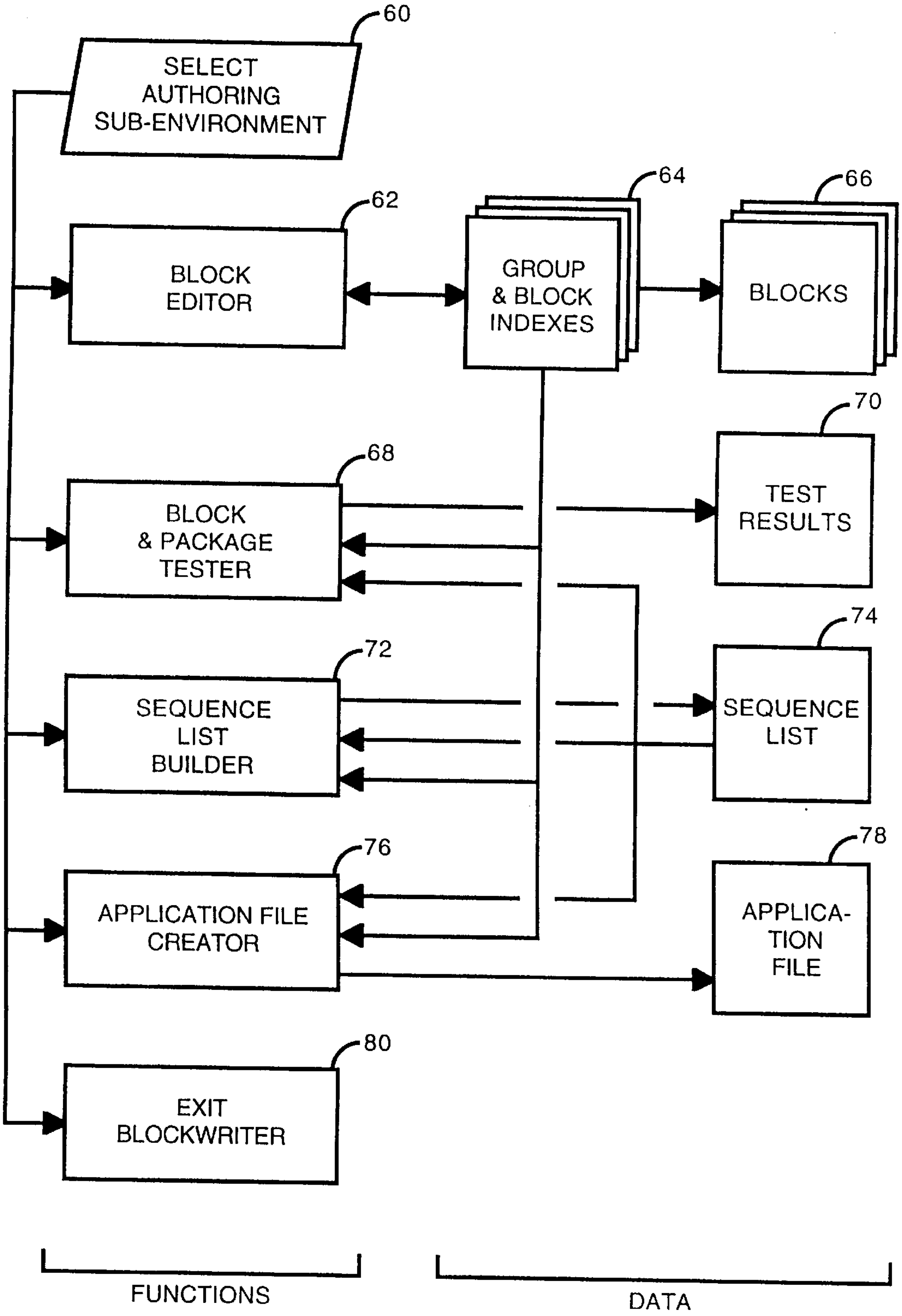
FIG. 4 is a block diagram of the software architecture of the authoring program of the decision management system.

FIG. 4 is a diagram of the software architecture of the authoring program 22. The authoring program 22 provides several environments in which the author can work to accomplish different tasks involved in the creation of a application program. From the opening screen of the interface 34 on a display the author uses menu choices to select a sub-environment 60 in which to work. The user can easily switch from any given environment to any other.

A block editor 62 is provided for manipulating program blocks and their contents. With the block editor, the user 50 creates blocks 66 for holding data in the form of text, references to other blocks and conditional statements. The blocks that can be created include question blocks for asking questions and answer blocks for accepting answers to questions. As explained previously, blocks are the computational units or programs out of which all application-programs 26 are built. Blocks are organized into groups, and indexes 64 are maintained which list (1) all groups, and (2) for each group, all blocks 66 within that group as illustrated in FIG. 2.

For inserting a reference to an indexed block, a selection mechanism such as a cursor 63 is provided as an arrow in FIG. 2. Cursor 63 may also be used for inserting a conditional statement into the opened block or other editing as well. The conditional statement is constructed to accept a reference to an indexed block as a condition for evaluation.

The block & package tester 68 permits an author to examine the behavior of all or part of a application program for a given set of inputs. Test results 70 is a display of the actual output produced by such an execution.

The sequence list builder 72 maintains in the sequence list 74 an ideal order in which the application questions should be asked of the user 50.

The application file creator 76 translates the application program 26 into a simplified format appropriate for transfer to other computing platforms. The translation is stored in the application file 78.

By selecting the exit authoring-program 80 choice, the user may quit the program.

As will be subsequently described, the block editor 62 of the authoring program is further constructed to create an answer block for holding an answer to a question each time the authoring program creates a question block for asking a question.

The authoring program further includes a Qset editor (described hereafter) for creating a help block for holding instructions for answering a question and a context block for giving the context of a question each time the program creates a question block for asking a question. Procedures described herein then allow an author to insert and edit instructions and advice to the user. The Qset editor also creates a question condition block in which conditions may be placed via an insert procedure. If the conditions are met a question in an associated question block will not be asked.

With the sequence list builder 72, the authoring program can require that questions in question blocks be asked in a predetermined sequence.

Authoring Program Environment Pseudocode

```
While <true>
Case <menu choice>
"<block editor>"
   block editor
"<block & package tester>"
   block & package tester
"<sequence list builder>"
   sequence list builder
"<application file creator>"
   application file creator
"<exit>"
   <quit the authoring program>
```

1. BLOCK CONTENT MANAGER

The Block Content Manager comprises several sub-environments to manipulate blocks and their contents. These are accessed with menu choices.

With the block editor the author may open any block in the application and manipulate its contents.

Questions are maintained as groups of related blocks called "Qsets". The "Qset editor" is a superset of the block editor, allowing the author simultaneous edit access to several blocks of a given Qset.

Forms are groups of Qsets presented to the user as a single display. The "form editor" provides the author with an environment to manipulate forms.

Block Content Manager Pseudocode

```
While <true>
Case <menu choice>
   "<block editor>"
      block editor
   <Qset editor>"
      Qset editor
   "<form editor>"
      form editor
```

2. BLOCK EDITOR

Figure 5:
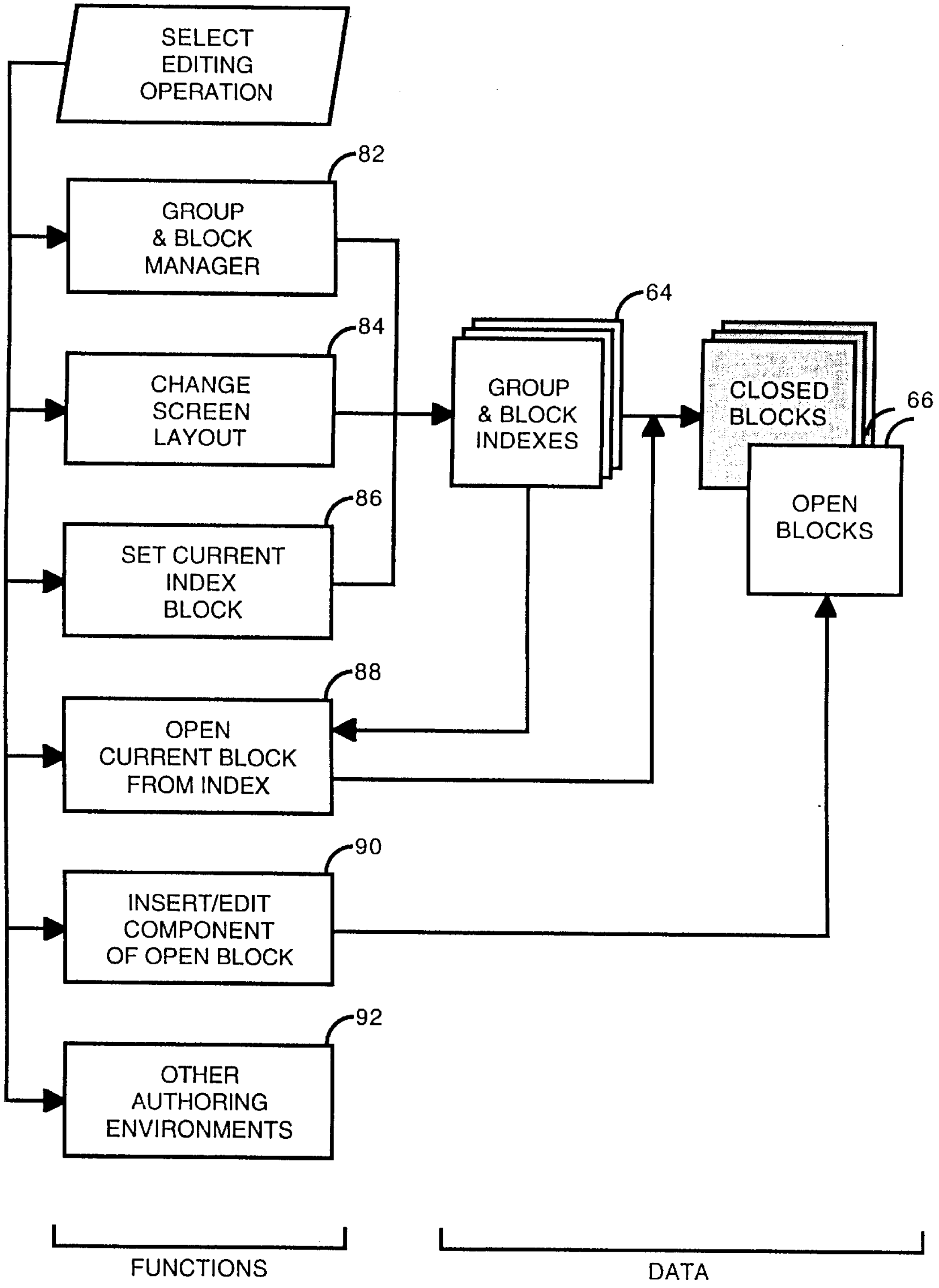
FIG. 5 is a flowchart illustrating the operation of a block editor within the authoring program.

Referring to FIG. 5, the block editor 62 is the primary environment in which the author works to create application programs 26. An application program includes one or more blocks. The blocks contain all of the text passages and computational statements that comprise the application program. Blocks are created, manipulated and edited in the block editor 62.

Blocks are organized into groups, and within the block editor, an index of all groups, and an index of all blocks within a selected group may be displayed. At any given time one of the blocks may be open for editing.

This is called the "open block", and its contents are displayed in a scrolling workspace where they may be manipulated. A different block may be selected in the index, called the "current index block". Its group is the "current index group". Most operations within the block editor that pertain to blocks manipulate the open block and the current index block.

The block editor provides function selection through menu choices or other on-screen controls to manipulate blocks, manipulate block contents, manipulate the indexes, arrange the layout of the screen, and to select a different environment or quit the authoring program.

The "group & block manger" functions 82 handle creation, deletion and renaming of blocks and groups. The "change screen layout" functions 84 allocate screen space among the block editor's various displays. The "set current group & block" functions 86 select the current index block and the current index group. The "open current block" function 88 opens the current index block. The "insert/edit component" functions 90 perform the actual editing of the open block's contents. The "authoring environments" functions 92 are the same choices available in all environments to move to a different environment or exit the authoring program.

Block Editor Pseudocode

```
While <true>
Case <menu choice>
"<group & block manager>"
  group & block manager
"<change screen layout"
  change screen layout
"<set current group & block in index>"
  set current group & block
"<open current block from index>"
  open current block
"<insert/edit component of open block>"
  insert/edit component
"<other authoring environments>"
  authoring environments
```

3. QSET EDITOR

Questions are implemented as a "question set" called a "Qset". a Qset is a set of blocks and other data structures which maintain the components related to any given question. The "Qset editor" permits the author to manipulate several Qset components simultaneously.

The Qset editor is accessed with a menu choice which relies on the current index block being a member of the Qset to be edited. Within the Qset editor, the author may select between one and four of the Qset's seven members for simultaneous display. The Qset members are the six Qset blocks: "question", "help", "context", "question condition", "suggested answer" and "answer choice list", as well as the "answer format" data structure.

If "answer format" is one of the members selected for display, the displayed dialogue will permit the author to set the type of the answer, to one of "text", "single choice", "multiple choice", "acknowledge", "number", "date", "currency". The answer format dialogue also lets the author set whether any of the three "abstract answers" are permitted for this Qset. The abstract answers are not actual values, but rather properties of an answer. If permitted by the author they may be chosen by the user in lieu of providing an actual value in answering a question. The three abstract answers are: "N/A" which generally lets the user express that there will never be an answer to this question; "Blank" which lets the user request that a section of blank space be substituted for an actual answer (for answers that will be inserted in output produced by the application, this allows the answers to be filled in while editing the final document); and "OK", which has no fixed meaning (the application will typically interpret this answer based on instructions to the user contained in the text of the question). If the author enables the "Blank" answer, then the author may pick one of several character strings to be used as the blank section if the user picks the "Blank" answer.

Qset Editor Pseudocode

```
if <current index block is not Qset member>
  return
 <close index>
 <enable Qset member selection dialogue>
 while <true>
   if <user requests change in Qset member display>
     <adapt screen layout to request>
   if <user placed cursor in Qset member block>
     insert/ edit component
   if <user places cursor in answer format dialogue>
     <enable user editing of answer format fields>
```

4. GROUP & BLOCK MANAGER

Through menu choices within the block editor, the group & block manager 82 gives the author access to six functions for creating, renaming and deleting groups and blocks. These functions are discussed in the following sections and include creating a block group, renaming a group, deleting a group, creating a block, renaming a block and deleting a block.

Group & Block Manager Pseudocode

```
While <true>
Case <menu choice>
"<create group>"
  create group
"<rename group>"
  rename group
"<delete group>"
  delete group
"<create block>"
  create block
"<rename block>"
  rename block
"<delete block>"
  delete block
```

5. CREATE GROUP

A Create Group procedure presents the author with an edit box to capture the name of the new group. The name is checked for validity, and the new group is created.

Create Group Pseudocode

```
<solicit new group name dialogue>
if <name is valid>
  <create the group>
Else
  <display error message>
Return
```

6. RENAME GROUP

The Rename Group presents the author with an edit box to capture a new name for an existing group. If the current index group is not a "system" group (whose name may not be changed), the name is checked for validity, and the new name is assigned to the group.

Rename Group Pseudocode

```
If <selected group is a system group>
  <display error message>
  Return
<solicit new group name dialogue>
if <name is valid>
  <rename the group>
```

-continued

Rename Group Pseudocode

```
Else
    <display error message>
Return
```

7. DELETE GROUP

The Delete Group procedure allows a user to delete a group from the application program. If the current index group is a non-deletable "system group", the authoring program displays an error message and terminates the operation. Otherwise, this procedure presents the author with a dialogue confirming the deletion. On confirmation, the current index group and all the blocks that belong to it are deleted.

Delete Group Pseudocode

```
If <group is a "system group">
    <error message>
    Return
If <confirm delete>
    <delete group's blocks>
    <delete current index group>
Return
```

8. CREATE BLOCK

The Create Block procedure presents the author with an edit box to capture the name of the new block. The name is checked for validity, and the new block is created within the current index group. If this is a Qset group, the other blocks of the Qset are automatically created.

Create Block Pseudocode

```
If <current index group is restricted>
    <display error message>
    Return
<solicit new block name dialogue>
if <name is invalid>
    <display error message>
    Return
<create the block>
If <current index group is Qset group>
    <create other blocks of Qset>
Return
```

9. RENAME BLOCK

The Rename Block procedure presents the author with an edit box to capture a new name for the current index block. The name is checked for validity, and the new name assigned to the block. If the block was a member of a Qset, the other members names are correspondingly changed. All references within the application may be changed to conform to the new block name.

Rename Block Pseudocode

```
If <current index group or current index block is
restricted>
    <display error message>
    Return
<solicit new block name dialogue>
if <name is invalid>
    <display error message>
    Return
<rename the block>
If <current index group is Qset group>
```

-continued

Rename Block Pseudocode

```
    <rename other blocks of Qset>
Return
```

10. DELETE BLOCK

The Delete Block procedure presents the author with a dialogue confirming the deletion. On confirmation, the current index block is deleted. If the block was a member of a Qset, the other members are also deleted.

Delete Block Pseudocode

```
If <confirm delete>
    <delete the current index block>
If <current index group is Qset group>
    <delete other blocks of Qset>
Return
```

11. CHANGE SCREEN LAYOUT

Figure 6:
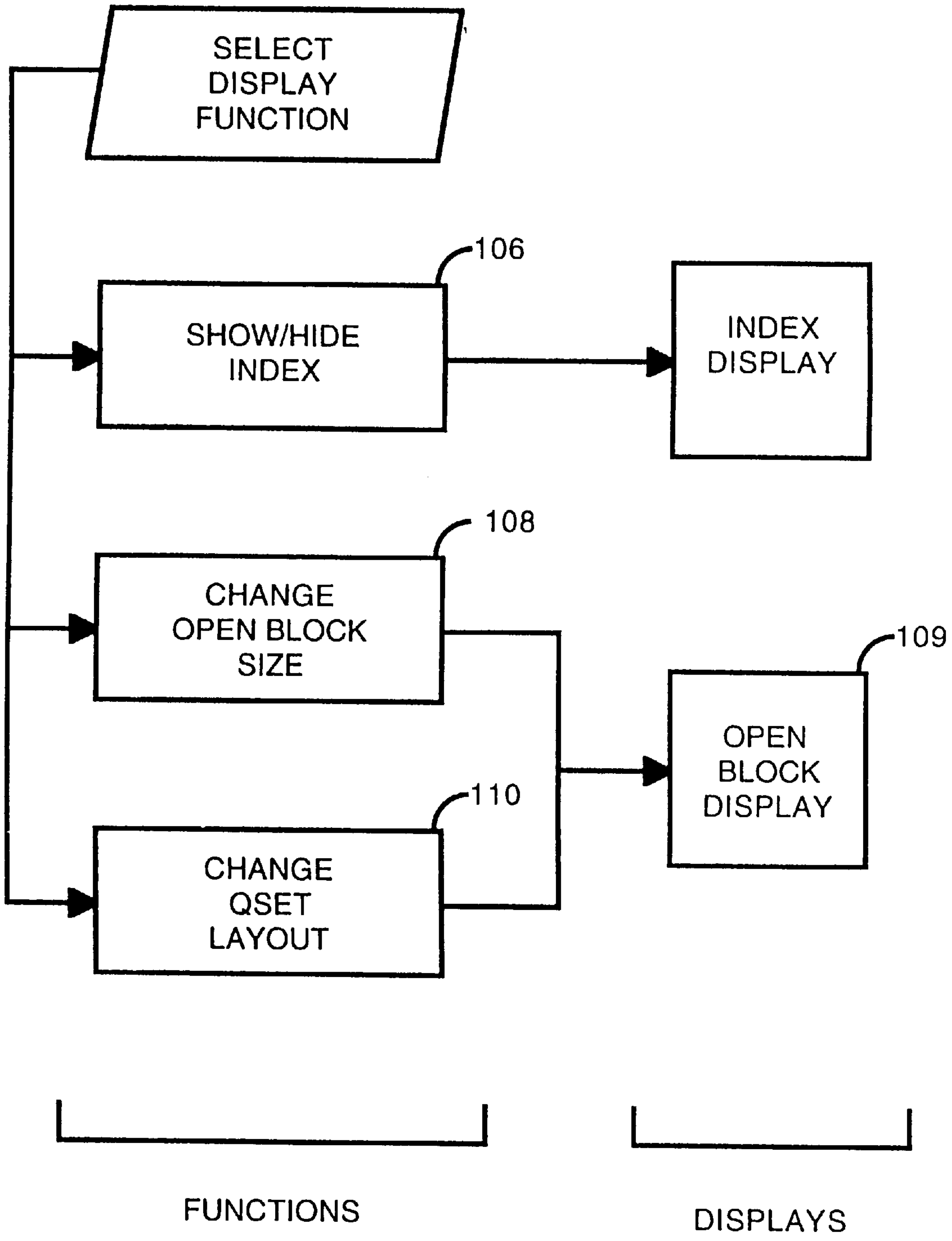
FIG. 6 is a flowchart of a change screen layout procedure within the block editor of FIG. 5.

Referring back to FIG. 5, a second group of functions within the block editor 62 is the Change Screen Layout functions 84. These functions are made available to the author through a variety of menu choices and other on-screen controls shown in FIG. 6. The "show/hide index" functions 106 permit the user to display or erase from the screen the group index and the index of the current index group's blocks. The "change open block size" function 108 permits the user to shrink or expand the screen size of the open block display 109, and to allocate screen space among the block editor's windows in various proportions. The "Change Qset layout" procedure 110 handles the special case of screen allocation among the members of a Qset.

Change Screen Layout Pseudocode

```
Case <menu or control choice>
    "<show/hide index>"
     <show/hide index>
    "<change open block size>"
     <change open block size>
    "<change Qset layout>"
     change Qset layout
```

12. INSERT/EDIT COMPONENT

Referring back to FIG. 5, this group of operations 90 is used by the author to accomplish the actual creation and editing of the contents of the blocks that comprise the application program. These operations are always available to be performed within the block editor's open block, if there is one.

Figure 7:
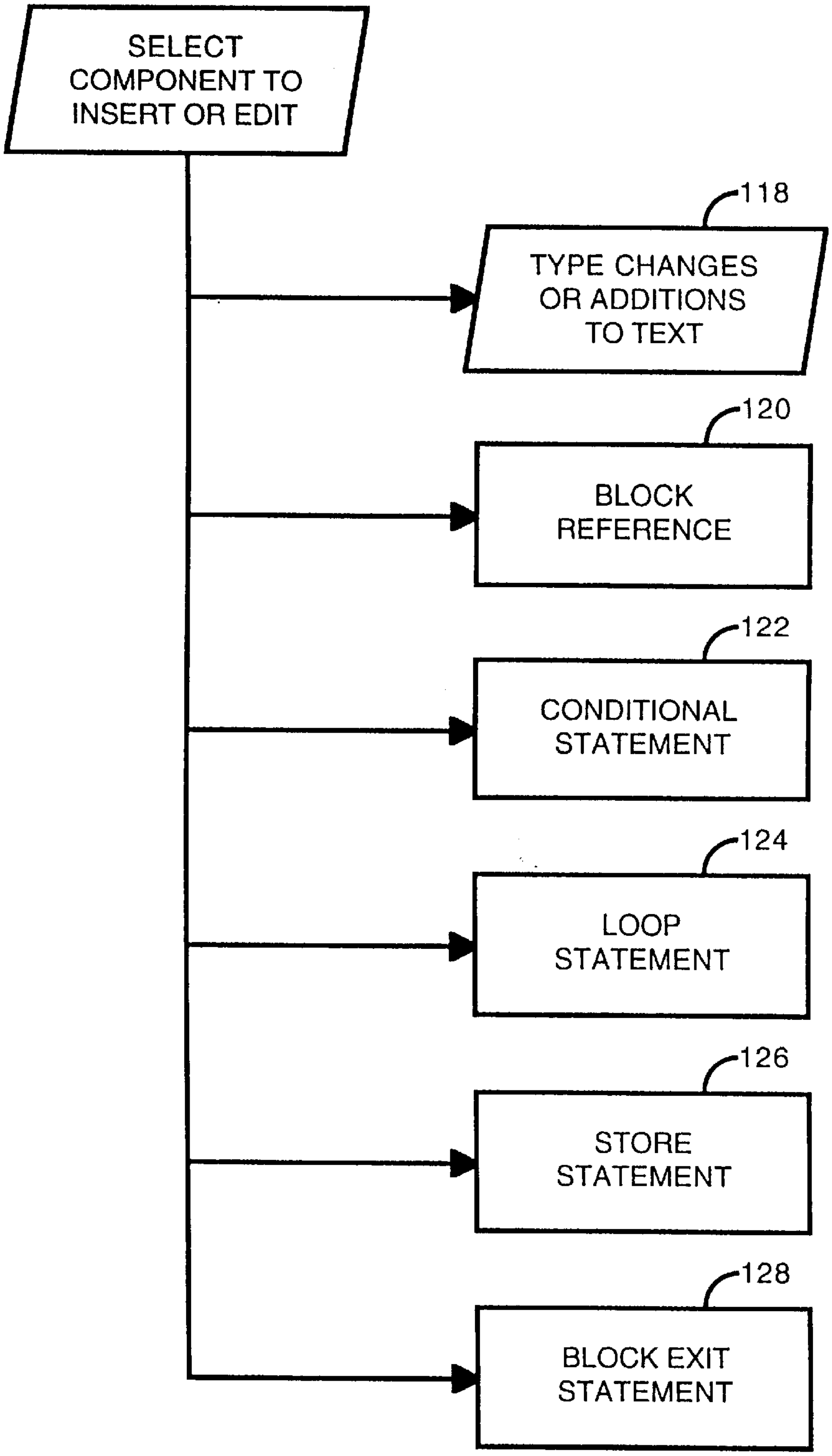
FIG. 7 is a flowchart of an insert/edit component procedure within the block editor of FIG. 5.

The operations 90 are shown specifically in FIG. 7. To "type changes and additions to text" 118, the author selects text or places the cursor in the open block and edits its contents using the common text editing facilities. The open block is a scrolling window, so the extent of the block's contents is not limited by the size of the screen window.

The "block reference" procedure 120 places a reference code to the current index block at the cursor location in the open block.

The "conditional statement" procedure 122 conducts a dialogue with the author for either editing an existing conditional statement or for placing a new conditional statement in the open block at the cursor location.

The "loop statement" procedure 124 conducts a dialogue with the author for either editing an existing loop statement or for placing a new loop statement in the open block at the cursor location.

The "store statement" procedure 126 conducts a dialogue with the author for assigning a value to a given selected block in the index.

The "block exit statement" procedure 128 conducts a dialogue with the author for placing a block exit statement in the open block at the cursor location.

Insert/Edit Component Pseudocode

```
Case <menu or control choice>
  "<type changes or additions to text>"
   <author: edit open block>
  "<block reference>"
   block reference
  "<conditional statement>"
   conditional statement
  "<loop statement>"
   loop statement
  "<store statement>"
   store statement
  "<block exit statement>"
   block exit statement
```

13. BLOCK REFERENCE

The Block Reference procedure 118 in FIG. 7 is described in pseudocode below. To include a reference in the open block to another block, the author establishes the desired block as the current index block, sets the cursor at the appropriate location in the open block, and then picks the "Insert Block Reference" choice off the "Insert" menu within the block editor. The authoring program responds by inserting an encoded reference to the current index block at the cursor location of the open block.

Block Reference Pseudocode

```
set current index block
<author: set cursor location in index block>
<menu choice: insert block reference>
<insert reference code>
```

14. SET CURRENT INDEX BLOCK

The procedure for establishing a new current index block in the Block Reference procedure 118 is described in the pseudocode below. The author first selects the correct group (if it's not already selected) from the group index. Second, the author selects the correct block from the block index (which always displays the blocks of the selected group). The indexes are scrolling alphabetic lists of group names and block names. Selection is accomplished by clicking the mouse on the desired name. The selected name is displayed in the title bar of the index window.

Set Current Index Block Pseudocode

```
If <author: the current index group is not correct>
   <author: select another group>
If <author: the current index block is not correct>
   <author: select another block>
<display new current index group & block>
```

15. INDEX VIEWER

Activating an "index viewer" on-screen control displays the contents of the current index block in a window. The display may not be edited. This feature enables the author to rapidly view one block while editing another. The index viewer control may optionally be "locked on", which causes the new current index block to be displayed each time it is changed. This permits the author to glance at a sequence blocks with a minimum of manipulation.

Index Viewer Pseudocode

```
set current index block
if <user selects index view control>
   <display current index block in window>
if <user clicks mouse in window>
   <close window>
```

16. INSERT/EDIT CONDITIONAL

Referring to FIG. 7, the Insert/Edit Component procedure 90 includes a conditional statement procedure 122. To insert a new conditional statement with this procedure in the open block, the author starts by placing the cursor 63 at the desired insertion point. To edit an existing conditional statement, the cursor is placed anywhere within the first line of the existing conditional statement. The second step is for the author to choose either "if-then" or "if-then-else" from the "insert" menu. Unless a conditional statement template is already open, the "open conditional statement template" 130 procedure is called. A conditional statement may not nest another conditional statement within itself, but may contain a reference to another block that does contain an additional conditional statement.

Conditional Statement Pseudocode

```
If <author: new conditional statement>
   <author: place cursor at insertion point>
Else
   <author: place cursor in first line of existing
conditional statement>
If <author: "if-then-else" type>
   <menu choice: "if-then-else">
Else
   <menu choice: "if-then">
If <no conditional statement template already open>
   conditional statement template
```

17. CONDITIONAL STATEMENT TEMPLATE

The Conditional Statement Template procedure referred to in the pseudocode above is described in detail in the pseudocode below. In preparation to opening the conditional statement template, the authoring program first invites the author to name a new, or rename an existing, conditional statement. The authoring program also gives the author the opportunity to change the form of the conditional statement between "if-then" and "if-then-else". Next the template is opened and displayed to the author, and then an "edit conditional statement" procedure is called. Controls are provided to close the template and to save the conditional statement defined by the contents of the template.

Conditional Statement Template Pseudocode

```
<solicit conditional statement name>
<solicit change of conditional statement form
<open template>
edit conditional statement
If <author: save conditional statement>
   <assemble & insert conditional statement in open block>
<close template>
```

18. EDIT CONDITIONAL STATEMENT

To edit the content of a conditional statement, the authoring program displays a template that lays out each of the conditional statement's three components (conditional expression, "THEN" part, "ELSE" part) in its own editable scrolling window. The author may move freely among the three components either with the tab key or by setting the cursor in any of the three template windows.

The details of editing the conditional expression are handled in a "construct conditional expression" procedure.

Editing the "then" part as with any block contents is accomplished with the "insert/edit component procedure 90, with the exception that another conditional statement may not be inserted into the contents of the "then" part.

If the conditional statement is of the "if-then-else" form, the author may edit its "else" part, following the same rules as with the "then" part.

Edit Conditional Statement Pseudocode

```
while <true>
If <author: edit conditional expression>
   construct conditional expression
If <author: edit "then" part>
   insert/ edit component
If <"if-then-else" form>
   If <author: edit "else" part>
      insert/edit component
```

19. CONDITIONAL EXPRESSION

A conditional expression is the component of a conditional statement that performs a logical operation that reduces either to "true" or "false". The most common such operation is a comparison, and for application programs, the most common of these is a comparison between the actual answer given by the user, and one of the possible answers provided by the author.

The application program provides a special "answer test expression" constructor to handle this case. Other conditional expressions are constructed like any other block contents, using the "insert/edit component" procedure.

To construct an answer test expression, the author first makes the answer block (in which, at run time, the actual answer will be found) the current index block, and then chooses menu item "answer test" from the "insert" menu.

The authoring program will display a list of the possible answers which the author has provided for the given question, and the author picks the one to compare with the actual answer.

Next, the authoring program solicits from the user the type of comparison that should be applied between the possible and actual answers.

After this, the authoring program asks the author whether the reference to the actual answer in the comparison should be "active" or "passive". These behave the same if an answer exists at the time of the reference. But if there is no answer, an active reference will cause the question to be asked at the time of the reference, while a passive reference simply returns an indication that the answer is empty.

Finally, the authoring program assembles the answer test conditional expression and inserts it in the expression box of the template.

Conditional Expression Pseudocode

```
If <author: wishes to construct custom expression>
   insert/edit component
   Return
If <author: wishes to construct answer test expression>
   <author: set answer block in index with . . .>
   set current index block
```

-continued

Conditional Expression Pseudocode

```
   <menu choice: "answer test">
   <display list of possible answers>
   <author: pick answer to compare>
   <display comparison types>
   <author: pick comparison to use>
   <ask author if answer reference is active or passive>
   <author: select active or passive reference>
   <assemble and insert answer test conditional expression
    in box>
Return
```

20. STORE STATEMENT

This procedure shown in FIG. 7 inserts a store statement at the cursor location. The Store statement permits the author to provide for the explicit replacement with an arbitrary value of the contents of FACT blocks.

The block to be stored into must be the current index block. For the value to be stored, the author has three options. (1) Literal text which the author provides by typing or pasting. (2) A block reference which is captured through a special dialogue. (3) As an optimization of the general block reference, an answer reference is captured with a simpler dialogue.

Store Statement Pseudocode

```
case <menu selection>
  <"store fact">
    if <index group is not "fact">
      return
    <"store answer">
      if <index group is not "answer">
        return
case <store value dialogue result>
  <"text">
    <enter text in dialogue>
  <"block reference">
    block identification dialogue
  <"answer reference">
    answer identification dialogue
<insert store statement at cursor>
```

21. BLOCK IDENTIFICATION DIALOGUE

The Block Identification Dialogue procedure detailed in the following pseudocode is used by other procedures to solicit a needed block identity from the author when the index (typically used for this purpose) is already committed to identifying some other block.

First, the dialogue presents the author with a list of all groups and solicits the author to pick one. Second, the dialogue presents the author with a list of all blocks within the selected group and solicits the author to pick the desired block.

Block Identification Dialogue Pseudocode

```
display group list
<solicit group selection from the author>
display selected group's block list
<solicit block selection from the author>
```

22. ANSWER IDENTIFICATION DIALOGUE

The Answer Identification Dialogue noted in the above pseudocode is used by other application program procedures to solicit a needed answer identity from the author when the index (typically used for this purpose) is already committed to identifying some other block.

The dialogue presents the author with a list of all answers and solicits the author to pick the desired one.

Answer Identification Dialogue Pseudocode

```
display answer list
<solicit answer selection from the author>
```

23. LOOP STATEMENT

The loop statement in FIG. 7 permits the author to include a loop in the contents of a block. The author is presented with a template consisting of two parts to be completed. Completing the "conditional expression" is described in the "construct conditional expression" procedure. The body of the loop is constructed in accordance with the "insert/edit component" procedure.

Loop Statement Pseudocode

```
display loop template
if <user places cursor in conditional expression box.
    construct conditional expression
if <user places cursor in loop body box.
    insert/edit component
```

24. APPLICATION TEST MANAGER

The Application Test Manager is a collection of procedures in the authoring program 22 used by the author to check the behavior of the application. The "block tester" will execute any given block, and all the blocks referenced from that origin. The "question tester" will present any of the application's questions along with all supporting fields.

Application Test Manager Pseudocode

```
case <menu choice>
  <"block tester">
    block tester
  <"question tester">
    question tester
```

25. BLOCK TESTER

An interpretive version of the execution program 28 is built into the authoring program 22 as a block tester. The block tester runs any block (identified by the current index block) producing a displayed result that may be edited and saved in a file. The behavior of the execution will be controlled by the answer set maintained by the authoring program. Any answers given during the execution will become part of the current answer set.

Block Tester Pseudocode

```
set current index block
run current index block
<display execution results in edit window>
<enable author to edit & file results>
```

26. QUESTION TESTER

The author uses this procedure in the authoring program to present any of the application's questions along with all supporting screens and fields, controlled by the state of the answer set maintained by the authoring program. The question to ask is identified by an opening dialogue that has the author pick a Qset off a displayed list of all Qsets in the application.

Question Tester Pseudocode

```
display Qset list
<solicit author to select Qset from list>
display question run-time dialogue
<solicit author to interact with dialogue>
```

27. SEQUENCE LIST MANAGER

This menu choice presents the author with a display of the sequence list structures, which consist of two lists of Qset names: the sequence list and the unlisted Qset list. The display includes the necessary controls to move names between the two lists, and to exit the sequence list manager. The author controls the order of the sequence list. The unlisted Qset list is always maintained in alphabetical order.

Sequence List Manager Pseudocode

```
display sequence list structures
<author edits sequence list>
<author exits sequence list manager>
```

28. INPUT/OUTPUT MANAGER

The input/output manager incorporates several input/output operations accessed through menu choices.

Input/Output Manager Pseudocode

```
case <menu choice>
  <"group lister">
    group lister
  <"Qset lister">
    Qset lister
  <"logic lister">
    logic lister
  <"help & notes window">
    help & notes window
  <"library builder">
    library builder
  <"application exporter">
    application exporter
  <"clear application">
    clear application
  <"import blocks">
    import blocks
  <"symbolic section number manager">
    symbolic section number manager
  <"search & replace">
    search & replace
  <"text window">
    text window
```

29. GROUP LISTER

This menu choice produces, in a window, a formatted display of the contents of all blocks in the current index group. The display may be edited and saved to a file.

Group Lister Pseudocode

```
set current index group
<display formatted listing in edit window>
<enable author to edit & file results>
```

30. QSET LISTER

This menu choice produces, in a window, a formatted display of the contents of all Qsets identified through a selection dialog. The display may be edited and saved to a file.

Qset Lister Pseudocode

```
select scope of Qsets to list
<display formatted listing in edit window>
<enable author to edit & file results>
```

31. LOGIC LISTER

This menu choice produces, in a window, a formatted display of the complete logical tree of processing permutations available from the origin of the current index block. The display may be edited and saved to a file.

Logic Lister Pseudocode

```
set current index block
<display formatted logic listing in edit window>
<enable author to edit & file results>
```

32. HELP & NOTES WINDOW

The help & notes file is part of the authoring program 22 provided to an author. The file initially contains information on a variety of subjects relevant to the authoring process. The author may modify or augment this file to accumulate the author's own notes during authoring. This menu choice opens the current help & notes file for editing. The author may edit and save the file.

Help & Notes Window Pseudocode

```
<open help & notes file>
<enable author to edit & file results>
```

33. LIBRARY BUILDER

This menu choice creates a library file from the current index group. A library file stores the contents of the group's blocks in a format that enables the end user to modify the contents.

Library Buiider Pseudocode

```
set current index block
<create library file>
```

34. APPLICATION EXPORTER

This menu choice creates an application export file for the application. This file contains the substance of the application in a format that permits the application to be transported to different computing platforms.

Application Exporter Pseudocode

```
<translate application to export format>
<write application export file>
```

35. CLEAR APPLICATION

This menu choice erases all application dependent data structures. The authoring program 22 is returned to its initial empty state.

Clear Application Pseudocode

```
<clear all application dependent data structures>
```

36. IMPORT BLOCKS

This menu choice manages the copying of blocks from one application into another. From within the local application the author identifies through a dialog the remote application. The authoring program either imports the entire remote application or displays the remote application's index, and the user selects the group or block to be moved. Further menu choices move the selected group or block. The author exits the import block operation by closing the remote index.

Import Blocks Pseudocode

```
<display open dialog>
<author opens remote application>
<display remote application index>
while <remote index open>
   set remote index block & group
   <import block or group>
```

37. SYMBOLIC SECTION NUMBERS

The symbolic section number facility of the authoring program manages a data base of symbols which may be arbitrarily inserted by the author into text within blocks. At run time these symbols will be converted into section numbers. Symbols are "declared" when they are placed at the location where the author expects them to be treated as actual numbers in a sequence of automatically assigned section numbers. Symbols are "referenced" when the author expects them to be replaced in the text by a section number declared elsewhere. Symbols may be referenced anywhere, but may be declared only in one location.

This menu choice displays a compound list of symbols identifying which have been already declared and which have been placed on the list but not yet declared. On-screen controls enable the author to perform the following symbol operations: (1) Add or delete a symbol from the compound list; (2) Declare a symbol on the list to be a symbol for a section number to be generated (at run time) at the current cursor location in the open block; (3) Insert a reference (a symbol declared elsewhere) at the current cursor location in the open block. At run time the actual number will be substituted for the symbol; (4) Search all blocks for references to undeclared symbols; (5) Search all blocks for occurrences of a given symbol.

Symbolic Section Numbers Pseudocode

```
<display symbol lists>
case <user selected symbol operation>
  "<add or delete symbol>"
     <add or delete symbol>
  "<declare symbol>"
     <declare symbol>
  "<insert reference>"
     <insert reference>
  "<search for an undeclared symbol>"
     <search for an undeclared symbol>
  "<search for a given symbol>"
     <search for a given symbol>
```

38. SEARCH & REPLACE

The authoring program 22 further provides the author with a comprehensive search and replace facility. The search & replace menu choice presents a dialog with which the author selects either a text string or a block reference as the subject for which to search. A second dialog solicits from the author a choice between the open block and all blocks as the scope of the search. A third dialog determines whether the operation should be a search or a replace. The search operation produces a search report which is displayed in a window, and may be edited and saved in a file. The replace operation solicits the author for the replacement text, and whether to employ the optional confirm step, and then performs the replacement.

Search & Replace Pseudocode

```
<present target select dialog>
if <target is string>
then <author enters search string>
if <target is block reference>
then <use current index block>
<present scope select dialog>
<present search/replace dialog>
if <operation is replace>
then
    <solicit replacement text>
    <ask whether to confirm>
    <perform replacement>
else
    <perform search>
    <display search report>
    <enable author to edit & file report>
```

39. TEXT WINDOW

This menu choice enables the author to open, view, and edit any file without leaving the authoring program.

Text Window Pseudocode

```
<present open dialog>
<display file in window>
<enable author to edit & save file>
```

C. Detailed Description of the Execution Program and Application Programs

Major execution program procedures are described textually and by pseudocode below, in conjunction with a related flowchart. Individual procedures are identified by a numeral. Actions taken within a procedure are identified by a numeral in parentheses.

1. Main Loop

Figure 8:
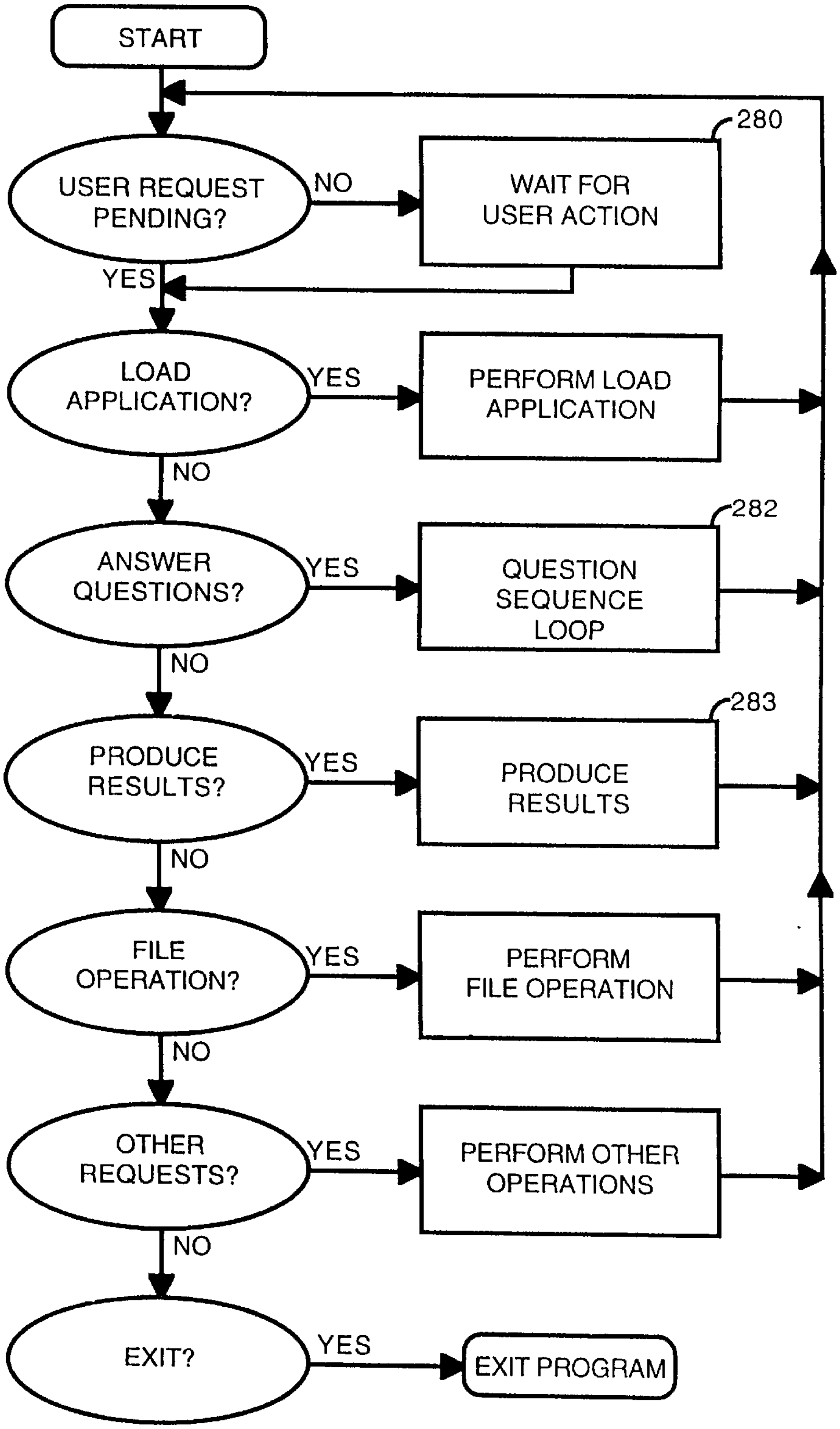
FIG. 8 is a flowchart of a main loop of the execution program that continually executes during operation of the execution program.

As shown in FIG. 8 (Main Loop), the main execution loop of the execution system is structured as a case statement that handles requests by the user. Main Loop is responsible for loading an application file, producing results for a user from the execution of an application file, manipulating specific files and exiting the execution system. As indicated in FIG. 8 this list of tasks is not exhaustive.

With reference to the first step in Main Loop, the execution system waits for user action if no user request is pending (280). Once a request is made, the main loop determines the nature of the request and branches to the appropriate procedure to carry out the request. These procedures, which include Question Sequence Loop 282, are described in the flowcharts that follow FIG. 8. Main Loop is also the procedure in which the user asks for results (283).

Main Loop Pseudocode

```
While <true>
  If <user request not pending>
  Then <wait for user request>
  Case USER REQUEST
    "<load application>"
      question sequence loop
    "<produce results>"
      produce results
    "<other requests>"
      <other operations.
    "<exit>"
      <quit the execution system>
```

2. Question Sequence Loop

If the user requests the execution system to load an application program 26, Main Loop loads the application 26 and then branches to the Question Sequence Loop 282. Procedure 282 is shown in further detail in FIG. 9 and includes several other procedures and a decision point. Procedure 282 begins by calling a Question Sequencer 284 shown in FIG. 10 to determine if there is another question on the sequence list to be asked. If there is another question, the procedure 282 calls Ask Question procedure 286 to ask the user the next question. If there is not another question, procedure 282 executes FirstBlock with the Process Block procedure, and then returns to Main Loop (FIG. 8). Procedure 282 also returns to Main Loop if the user makes a general request (a request outside the scope of asking and answering questions).

Question Sequence Loop Pseudocode

```
While <true>
  question sequencer
  If <there are no more questions>
  Then Return
  ask question
  If <general user request pending>
  Then Return
```

3. Question Sequencer

Figure 10:
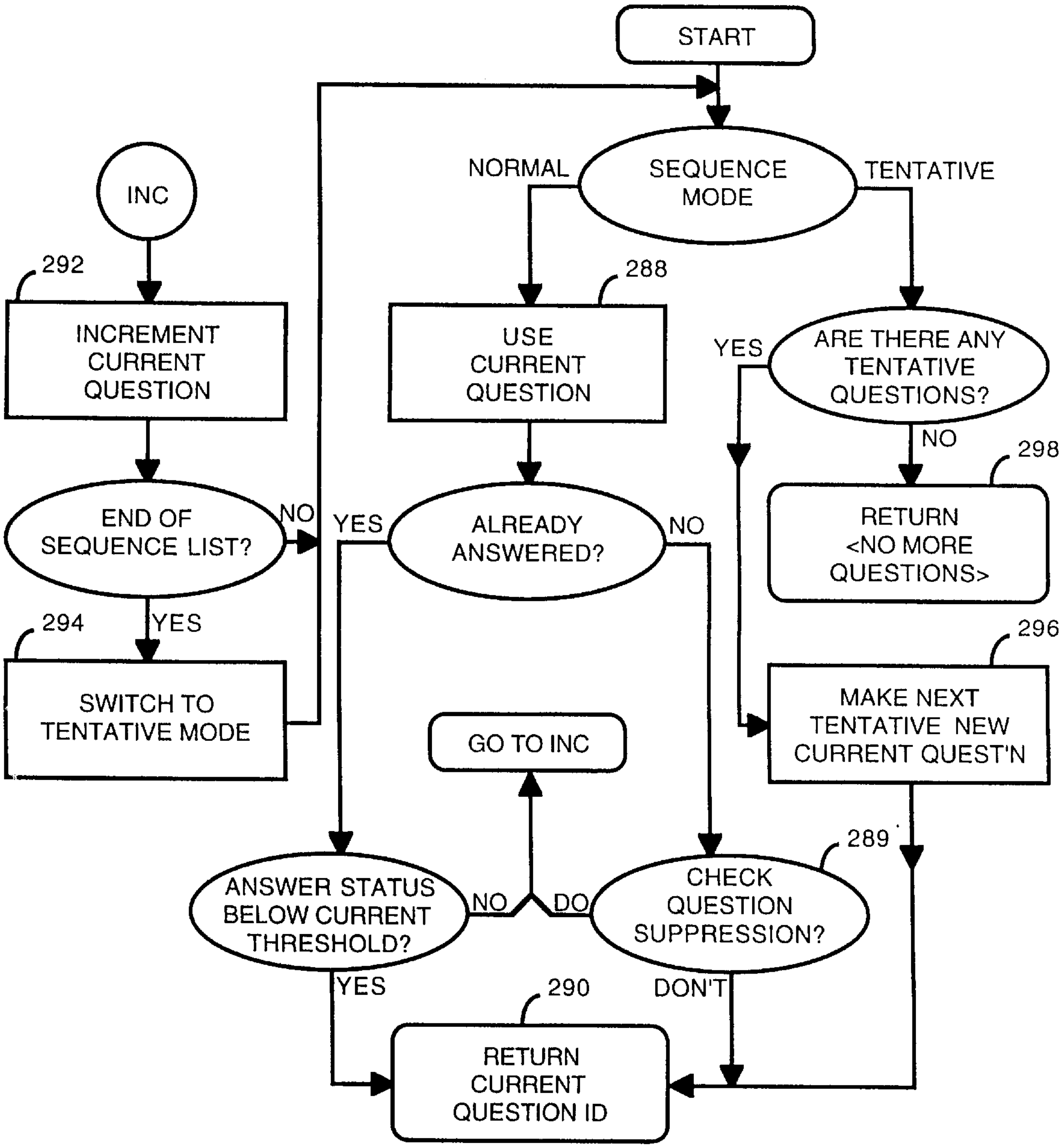
FIG. 10 is a flowchart of a question sequencer procedure that operates within the question sequence loop of FIG. 9.

The Question Sequencer procedure 284 in FIG. 10 determines if there is another question yet to be asked of the user 260 in running application program 26. Running an application program in the execution program 28 occurs in two stages. First, all of the questions on the sequence list that should be asked are asked. This is the function of the Question Sequencer Loop 282. Second, FirstBlock, the entry point to the execution system, is executed. Calling FirstBlock might result in more questions being asked "on-the-fly," as will be described.

Procedure 284 determines the sequence of questions asked during the first stage, and determines when this stage is complete. It returns to the Question Sequence Loop 282 either the identification of the question to ask next (the current question,) or an indication that there are no more questions to ask in this stage.

Assuming the normal sequence mode, the procedure 284 starts by examining the current question on the sequence list (288). If it is unanswered and not suppressed by a Check Question Suppression procedure 89, or if it is answered, but the status of the answer is below the threshold currently set by the user, then the ID of the current question is returned to procedure 282 as the next one to be asked (290). If, on the other hand, the current question is unanswered but suppressed, or answered with a status at or above the current threshold, the procedure 282 increments to the next question on the sequence list, and examines the new current question (292).

When procedure 282 reaches the end of the sequence list, the execution system switches from "normal" to "tentative" sequence mode (294). It proceeds as before, except that only questions marked as tentative are asked (296). All such tentative questions will sequentially and repeatedly be promoted to the current question, and reasked, until the user cancels the tentative status of all questions. At this point, there are no more questions to be asked from the sequence list, and procedure 284 returns this indication to the Question Sequencer Loop procedure 282 (298).

Question Sequencer Pseudocode

```
While <true>
  -- Processing for tentative mode.
  If SEQUENCE MODE = "<tentative>"
    If <there are any tentative questions>
    Then
      Set CURRENT QUESTION To <next tentative question>
      Return
    Else
      Set CURRENT QUESTION To <no more questions>
      Return
  -- Current question needs an answer and is not
    suppressed? -- ask it.
  If <there is no answer to the current question>
    and <the current question is not suppressed>
  Then Return
  -- Current question answered but status no good? -- ask
    it
  If <there is an answer to the current question>
    and <answer status too low>
  Then Return
  -- Otherwise try next question.
  <increment> CURRENT QUESTION
  If <end of sequence list>
  Then Set SEQUENCE MODE To <tentative>
  TopOfLoop
```

4. Check Question Suppression

Any question on the sequence list may be guarded by a "question condition." This is an optional program written by the author and contained in the question's data structure. Each question on the sequence list will be asked, in order, unless the question is suppressed by its own "question condition" program.

The Check Question Procedure 289 runs the current question's "question condition" program to determine whether the question should be asked or suppressed. The procedure begins by determining if a "question condition" block exists for the current question. If not, the procedure returns a "<don't suppress>" to Question Sequencer 284.

If a "question condition" program does exist for the current question, procedure 284 passes the "question condition" ID as a parameter to a Process Block procedure (to be described) and-then calls that procedure. If the result of calling Process Block is false (the question's conditions are not yet met), the procedure 289 returns "do suppress" to procedure 284. If the procedure 302 does not return false (the question's conditions have been met), procedure 289 returns "don't suppress."

Check Question Suppression Pseudocode

```
If <question condition does not exist>
Then Return "<don't suppress>"
process block (<question condition block ID>)
```

-continued

Check Question Suppression Pseudocode

```
If <accumulated result> = "<false>"
Then Return "<do suppress>"
Else Return "<don't suppress>"
```

5. Process Block

A block, whether it is a "question condition" block or other block in the application program 26, is a data structure consisting of a list of elements. Each element is an instruction intended for execution on virtual processor module 54. All the elements together comprise the block's virtual program. The Process Block procedure is the component of virtual processor module 54 that determines which block element to execute next, and what information returns when the block's program has run to completion.

Figure 11:
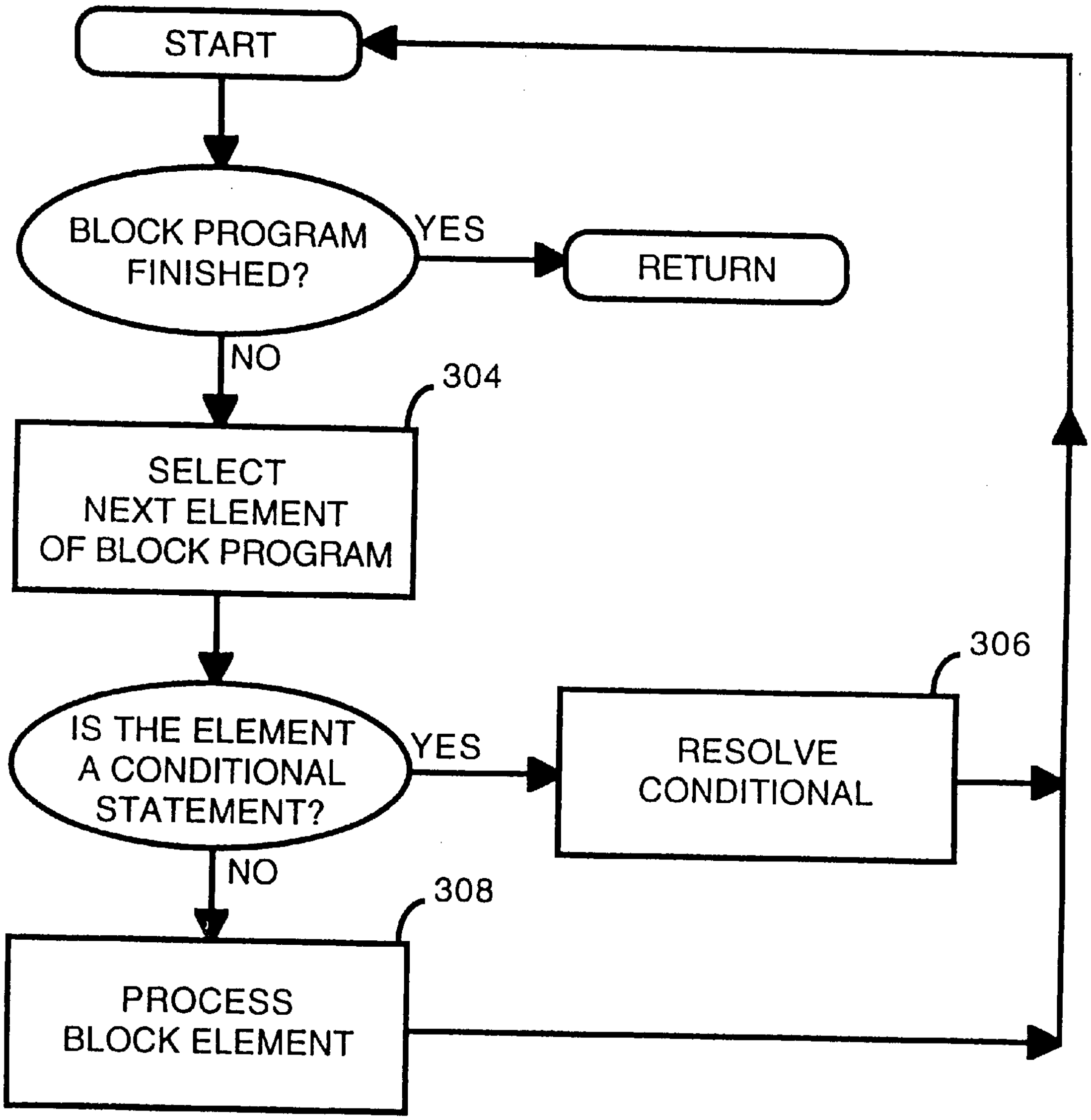
FIG. 11 is a flowchart of a process block procedure in the execution program for processing program blocks from the application program.

The Process Block procedure is shown in FIG. 11. It first checks to see the block program it is processing is finished, i.e., it encounters an exit block element signalling the block's end (300). If not, it selects the next element of the block program and determines how it should be treated (304). If the element is a conditional statement, the Process Block procedure calls a Resolve Conditional procedure (306). If the element is not a conditional statement, the Process Block procedure calls a Process Block Element procedure (308). The results of these procedures are returned to Process Block procedure. The Process Block Element procedure is responsible for the actual execution of the elements. The result of element execution is the accumulation of results in a data structure called Accumulated Result. Accumulated Result is used by many procedures, including Get Question.

Process Block Pseudocode

```
If <next block element> = <exit block>
Then return
select next element
If <next block element> = <conditional statement>
Then
  resolve conditional
  TopOfLoop
process block element
```

6. Resolve Conditional

Figure 12:
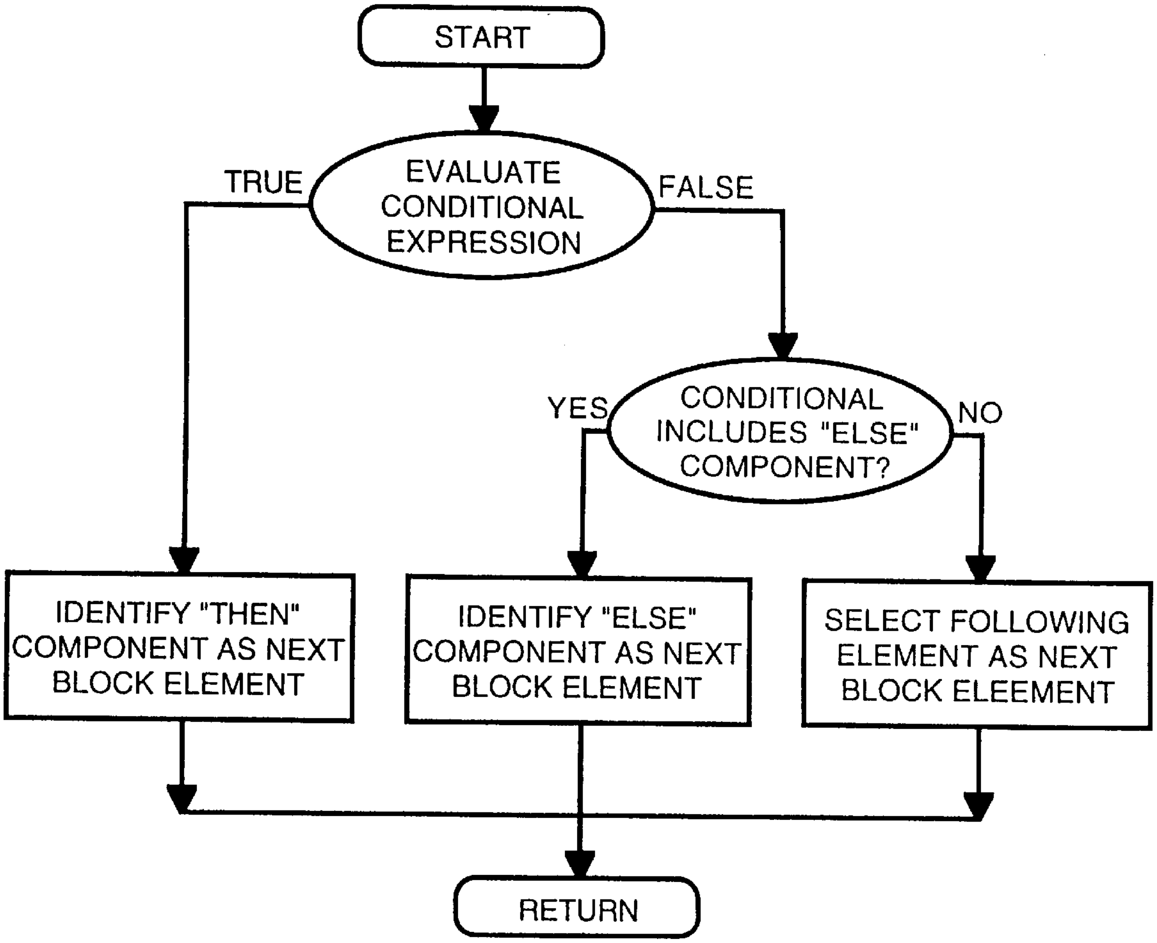
FIG. 12 is a flowchart of a resolve conditional procedure that operates within the process block procedure of FIG. 11.

A conditional statement comprises three components: a conditional expression, a Then component, and an Else component. The Else component may be empty. The Then and Else components are each groups of block elements. After executing either of these groups, processing continues with the block element following the entire conditional statement. The Resolve Conditional procedure illustrated in FIG. 12, evaluates a conditional expression of a conditional statement within a block program for true or false. Based on this evaluation, the procedure identifies the first element of either the Then or the Else component of the conditional statement as the next element to be executed.

Resolve Conditional Pseudocode

```
If <evaluate conditional expression>
Then Set <next block element> To <first element of <then>
component>
Else
  If <conditional statement includes <else> component>
  Then
```

-continued

Resolve Conditional Pseudocode

```
    Set <next block element>
    To <first element of <else> component>
  Else
    Set <next block element>
    To <first element following conditional statement>
Return
```

7. Process Block Element

Figure 13:
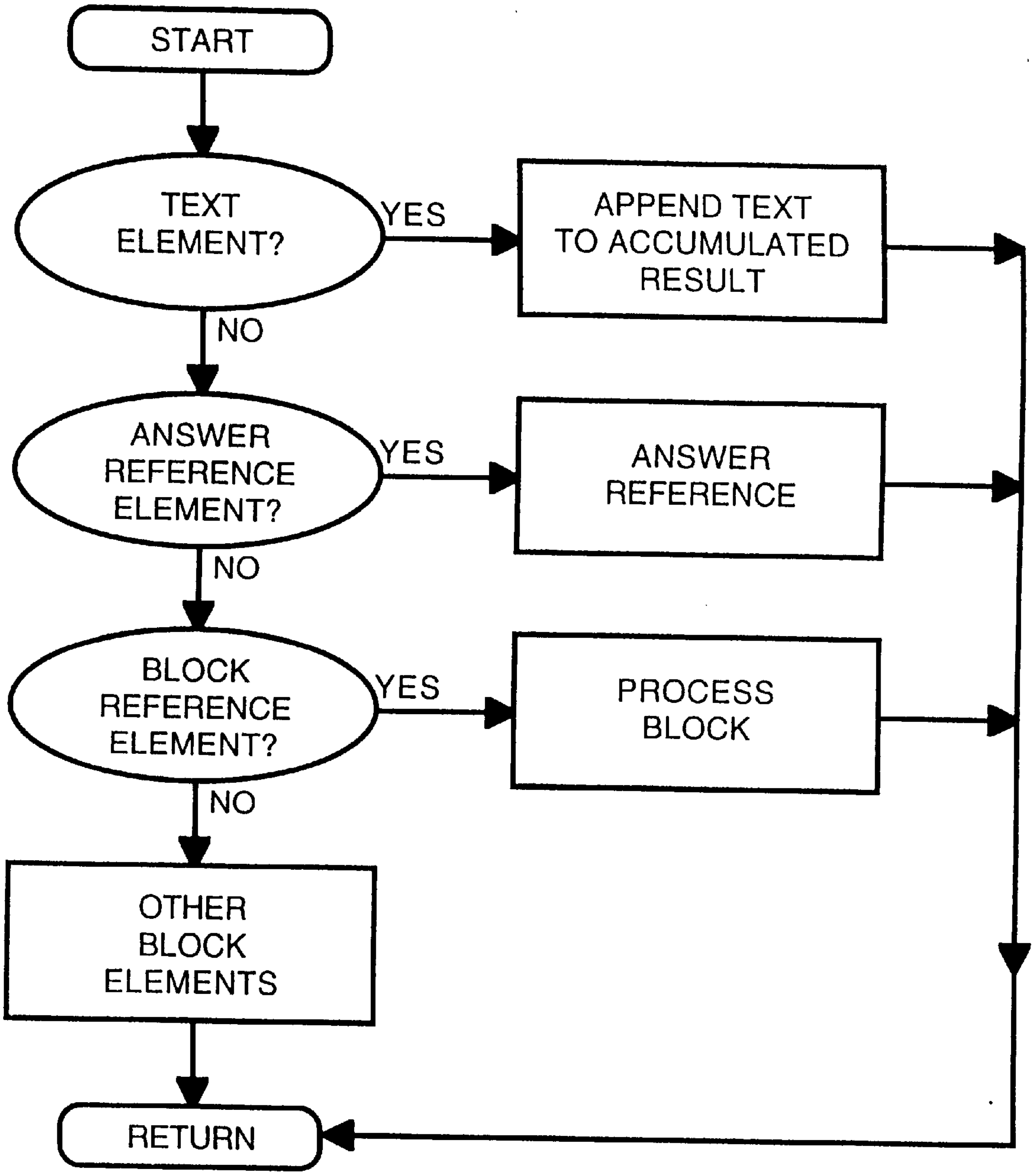
FIG. 13 is a flowchart of a process block element procedure that operates within the process block procedure of FIG. 11.
Figure 17:
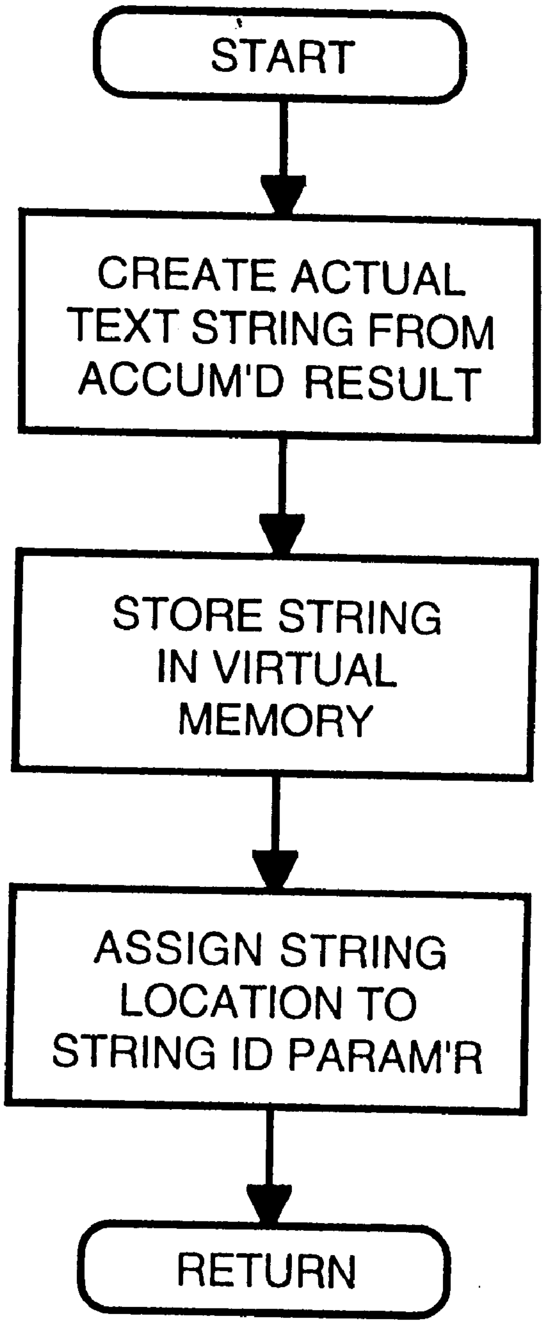
FIG. 17 is a flowchart of a store accumulated result procedure in the execution program.

As noted above, the Process Block Element procedure is responsible for executing the elements of a block program. The results of such execution is accumulated into a data structure called Accumulated Result. For each element whose execution produces a result, that result is appended to the preexisting result within the Accumulated Result procedure shown in FIG. 17. This Accumulated Result is emptied by a procedure Store Accumulated Result into the calling procedure, here the Process Block. FIG. 13 illustrates the operation of the Process Block Element procedure.

The Process Block Element procedure is essentially a case statement with a case for each element type.

A text element is a descriptor which identifies a fixed block of text. Its execution appends that text to the Accumulated Result. Answer reference elements are elements that involve a more detailed analysis, for which a procedure Answer Reference is called. Execution of a block reference element results in a recursive call on procedure Process Block. Any result produced by the recursive procedure is appended to the Accumulating Result.

Process Block Element Pseudocode

```
Case <element type>
  "<text>"
    <accumulate text into result>
  "<answer reference>"
    answer reference (<question ID>)
  "<block reference>"
    process block (<block id>)
  .
  .
  .
Return
```

8. Answer Reference

This procedure is called by the Process Block Element procedure and asks if the current question has an answer stored and, if yes, if the existing answer has a status at or above a current threshold. If so, the procedure appends the answer to the Accumulated Result. If not, the procedure calls the Ask Question procedure.

Answer Reference Pseudocode

```
If <no current answer>
  or <answer below current threshold>
Then ask question
<append answer to accumulated result>
```

9. Ask Question

Figure 9:
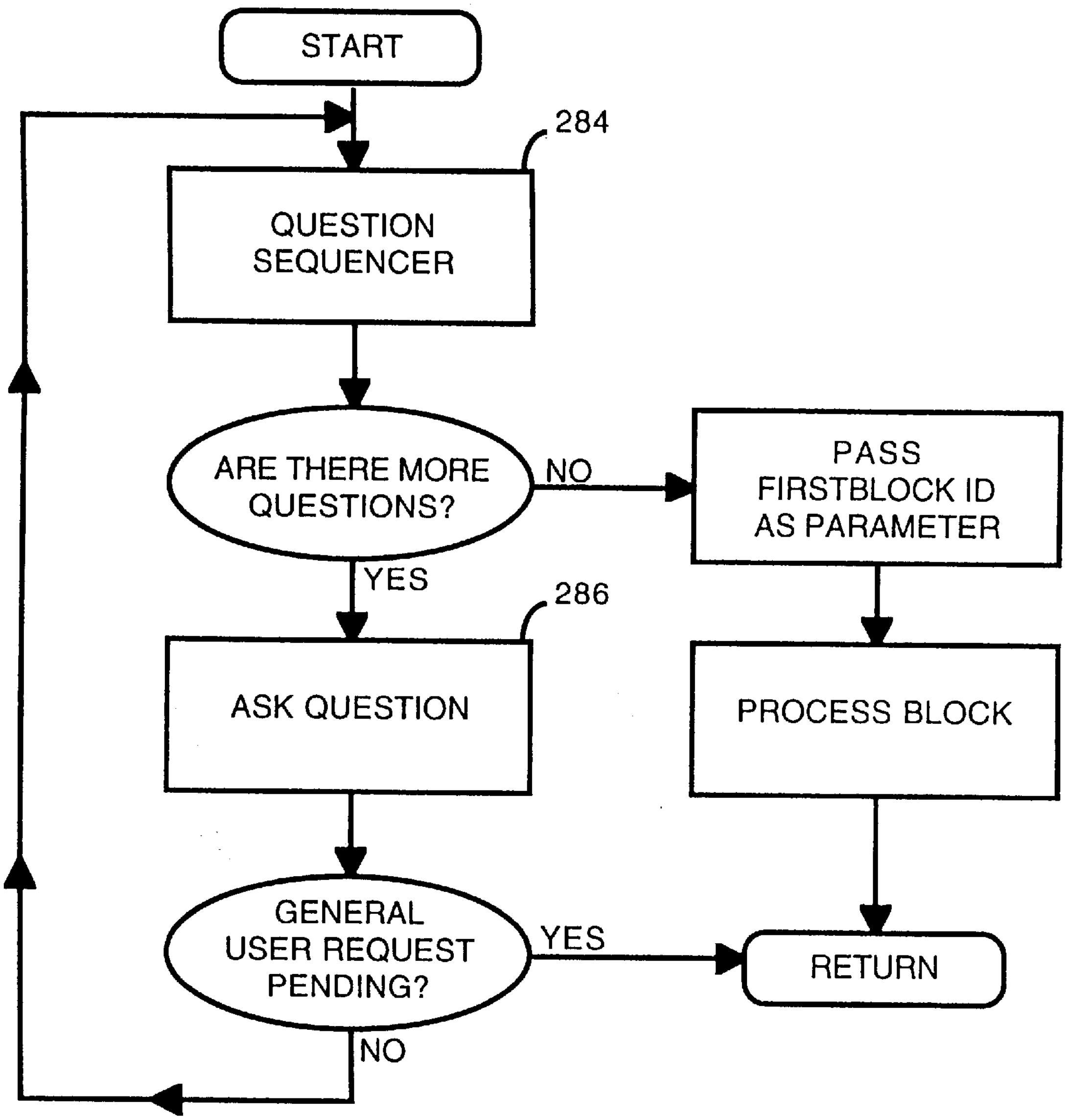
FIG. 9 is a flowchart of a question sequence loop that operates within the main loop of FIG. 8.

This procedure is called by the Question Sequence Loop 282 of FIG. 9, and by the Answer Reference procedure. It asks the identified question of the user and captures the user's answers. The Ask Question Procedure comprises calls to three other procedures: Generate Question, Present Question, and User Answer.

Ask Question Pseudocode

```
generate question
present question
user answer
Return
```

10. Generate Question

The Generate Question procedure produces text strings that, when displayed to the user, constitute asking the question. Three of these strings are produced by calling three procedures in Generate Question. Get Question constructs the text of the question itself. Get Prompt handles the construction of the list for multiple choice type questions. Retrieve Current Answer secures the text of a previous answer, or where appropriate, a suggested answer. The result of executing the Generate Question procedure is a data structure made up of these three text strings returned to the Ask Question procedure.

Generate Question Pseudocode

```
get question
get prompt
retrieve current answer
```

11. Get Question

This procedure produces the text of a question. A question's text is represented as a program contained in a data structure called the Question Block. For a given question, this block is identified by a number. In the Get Question procedure, the question block's identifying number is passed as a parameter to Process Block which runs the program in Question Block. The result of executing the Process Block procedure is the production of text. When Process Block returns, this text is stored into the question string, by calling Store Accumulated Result with the question string passed as a parameter to Accumulated Result.

Get Question Pseudocode

```
process block(<question block ID>)
store accumulated result(<question string ID>)
```

The accumulated result in the Get Question procedure is returned to the Generate Question procedure. At this point the text of the question as generated by any preexisting result is at hand. The Generate Question procedure then calls the Get Prompt procedure.

12. Get Prompt

This procedure produces the text of a question's prompt. For multiple choice type questions, the prompt specifies the list of choices presented to the user. A prompt's text is represented as a program contained in a data structure called the Prompt Block. For a given prompt, this block is identified by a number. The prompt block's identifying number is passed as a parameter to Process Block which runs the program. The result of this execution is the production of text which is also stored in the data structure Accumulated Result. When the Process Block procedure returns, this accumulated result is stored into the prompt string, by calling Store Accumulated Result with the prompt string passed as a parameter.

Get Prompt Pseudocode

```
process block(<prompt block ID>)
store accumulated result(<prompt string ID>)
Return
```

The last procedure called in the Generate Question procedure is the Retrieve Current Answer procedure.

13. Retrieve Current Answer

This procedure is responsible for reporting back with a given question's current answer, if it has one, and if there is no answer, reporting back that the answer is empty. This is distinguished from the Answer Reference procedure which will spontaneously ask the question if it finds the answer empty.

Note that the abstract answer "declined" is a bona fide answer, distinct from the empty answer.

If an answer exists it is plated in the question's answer string, and the procedure returns.

If this call arose through a call on Ask Question, the motive is to display the most helpful representation of the current answer to the user to help the user in selecting the user's own answer. To this end, if there is no answer, but a suggested answer program has been provided by the author for this question, then the suggested program is run through a call to Process Block and the Accumulated Result. The text of the suggested answer is then placed into the answer string and subsequently displayed to support the user in answering the question.

If this call arose from a Retrieve Current Answer in a block program, this indicates that the application is trying to determine if the user has answered the question. Substituting the suggested for an empty answer in this case would be misleading, and the answer string is set to empty.

Retrieve Current Answer Pseudocode

```
If <a real answer exists>
   <store the answer in the answer string>
   Return
If <call arose in a block program>
   <store <empty> into the answer string>
   Return
process block (<default block ID>)
store accumulated result (<answer string ID>)
Return
```

The result of calling these three procedures and the procedures they call is to generate and return to the Ask Question procedure the data structures necessary to present a question to the user.

The Ask Question procedure then calls the Present Question procedure.

14. Present Question

This procedure is responsible for presenting questions to the user in one of two forms, depending on the display mode. In the spreadsheet mode, the questions are presented in a compact format that compresses each question and current answer into a single line of a scrolling presentation. The current question is identified in the presentation. In the question mode, the current question, prompt and answer choices are displayed in full on the screen. The Present Question procedure then returns to the Ask Question procedure.

Present Question Pseudocode

```
If DISPLAY MODE = <spreadsheet>
Then
   <display spreadsheet>
   <identify current question on spreadsheet>
Else
   <display question>
   <display prompt if appropriate>
   <display existing or suggested answer if appropriate>
Return
```

The Ask Question procedure then calls the User Answer procedure.

15. User Answer

This procedure analyzes and stores an answer or certainty change provided by the user in response to the presented question. A certainty change is recorded in the certainty level field of the question data structure. An answer is recorded in the answer string field of the question data structure.

Any of the three abstract answer types (declined, blank, OK) are recorded in the answer string field of the question data structure. The Ask Question procedure then returns the answer to the Answer Reference procedure, which appends it to the data structure Accumulated Result.

User Answer Pseudocode

```
Case <answer type>
  "<certainty change>"
     <record new certainty level>
  "<ordinary answer>"
     <record new answer>
  "<declined>"
     <mark answer <declined>>
  "<blank>"
     <mark answer <blank>>
  <"OK>"
     <mark answer <OK>>
Return
```

16. Get Answer

Figure 14:
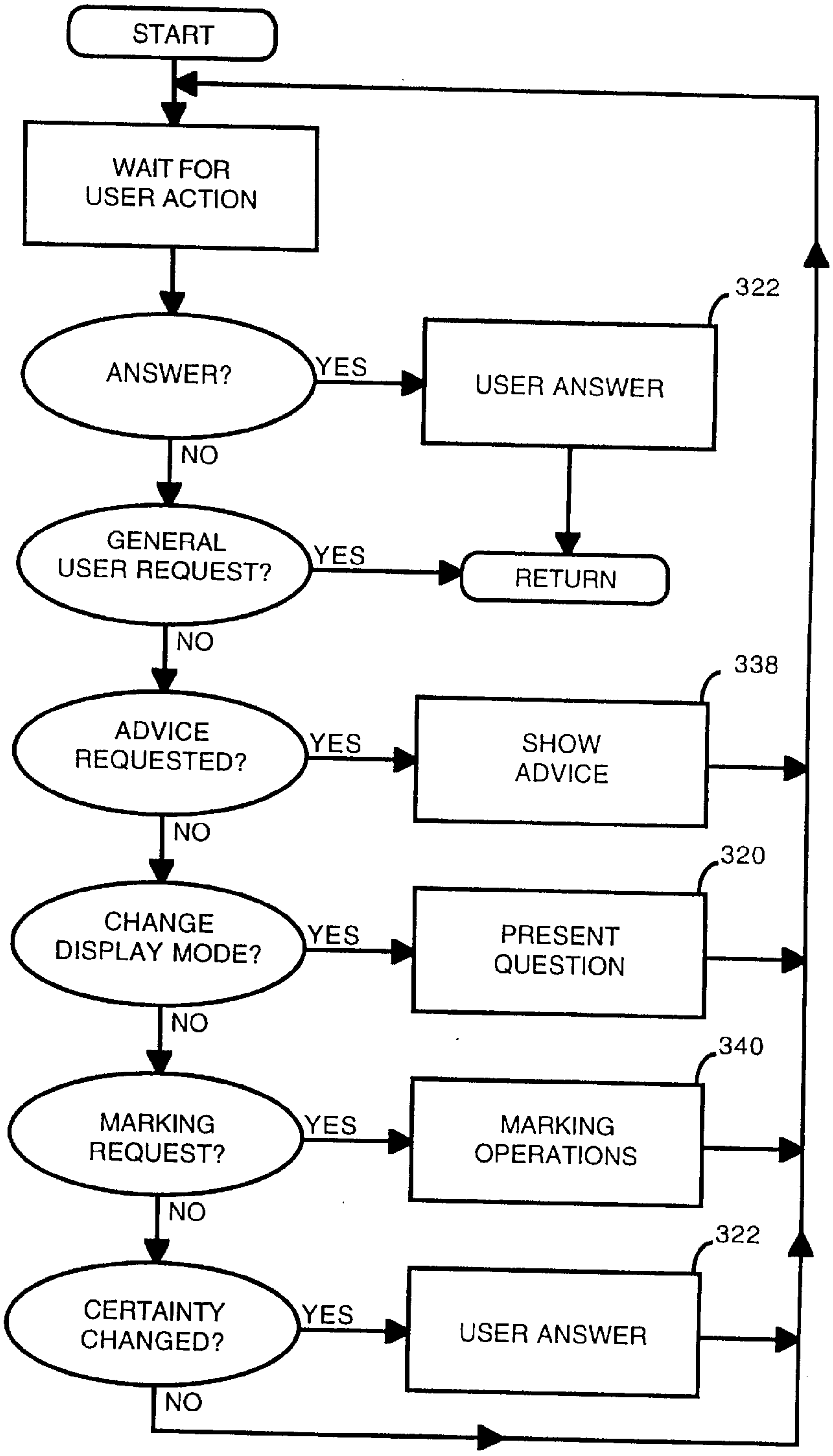
FIG. 14 is a flowchart of a get answer procedure in the execution program for getting answers from user input and passing the answers on to other procedures within the program.

This procedure, illustrated in FIG. 14, processes user activity while awaiting a user answer to a presented question. The structure is a case statement within an endless loop.

The Get Answer procedure will process repeated user requests related to securing an answer until an answer is finally given via User Answer procedure. At this point the Get Answer procedure calls the User Answer procedure to analyze and store the answer.

If the user requests a service unrelated to providing an answer (a general user request) the procedure returns back to the execution system's main loop where these requests are handled.

Request for display of advice, "help" and "context," are handled by a Show Advice procedure 338 to be described. On return, Get Answer continues.

If the user changes the display mode between the a full question presentation and the spreadsheet, the Present Question procedure is called to present the correct display, after which Get Answer continues.

If the user requests a marking operation, this is accomplished by a Marking Operations procedure 340. Upon return, Get Answer continues.

Changes to an answer's certainty are handled (as with changes to the answer) by the procedure User Answer 322. But after returning from a certainty change Get Answer continues, rather than returning.

Any other user action is ignored, and Get Answer continues.

GET ANSWER PSEUDOCODE

```
While <true>
  Case <user action>
    "<answer>"
      user answer
      Return
    "<general user request>"
      Return
    "<advice request>"
      show advice
      TopOfLoop
    "<change display mode>"
      present question
      TopOfLoop
    "<marking request>"
      marking operations
      TopOfLoop
    "<change certainty request>"
      user answer
      TopOfLoop
    "<any other value>
      TopOfLoop
```

17. Show Advice

Figure 15:
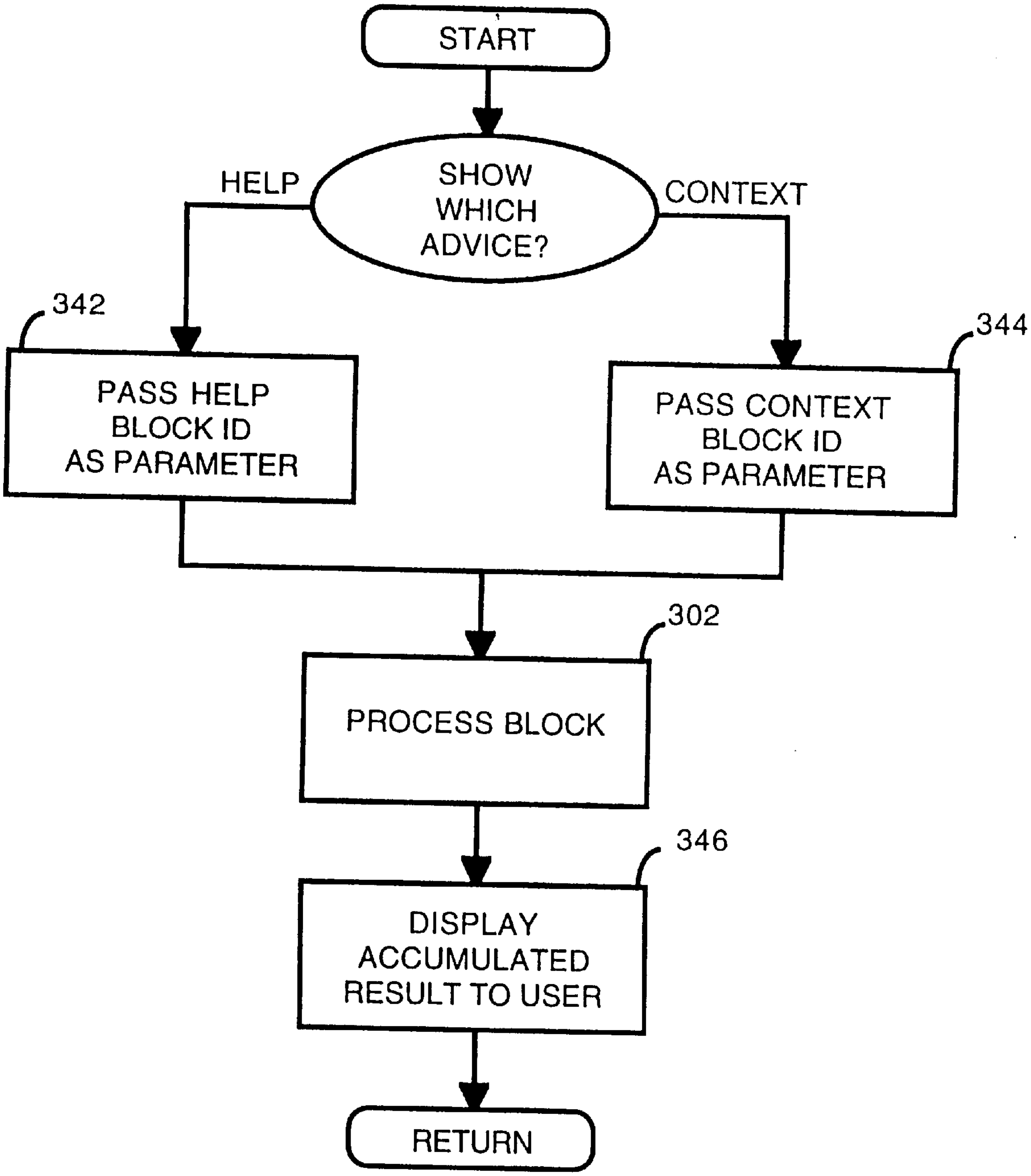
FIG. 15 is a flowchart of a show advice procedure that operates within the get answer procedure of FIG. 14.
Figure 16:
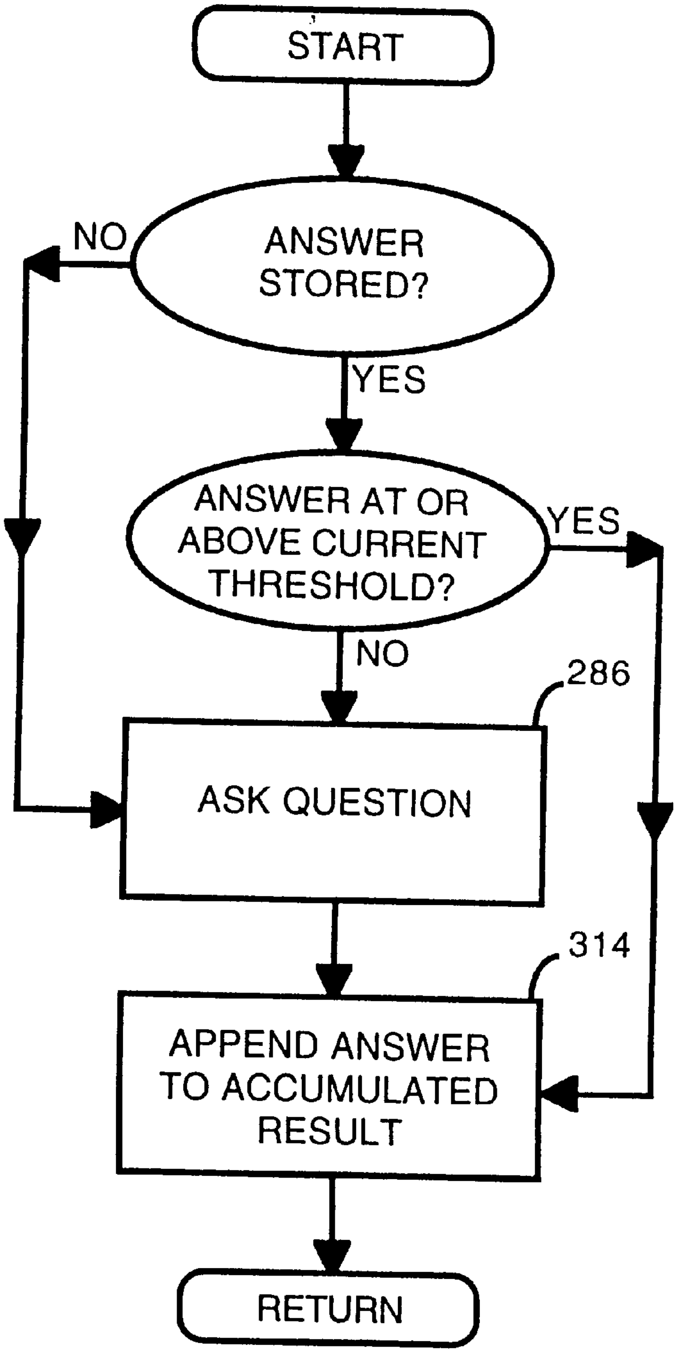
FIG. 16 is a flowchart of an answer reference procedure in the execution program for checking for previous references to an answer.

This procedure, shown in FIG. 15, is called when the user requests advice to assist in the answering of a question. First the procedure determines whether the user requested "help" advice or "context" advice, and then calls Process Block 302, passing as a parameter the appropriate (help or context) block identifier belonging to the current question (342, 344). On return from Process Block, the accumulated result is displayed for the user (346), and Show Advice 338 returns to its caller.

Show Advice Pseudocode

```
If <advice type requested> = <help>
Then process block (<help block ID>)
Else process block (<context block ID>)
<display accumulated result>
Return
```

20. Marking Operations

This procedure allows the user to select a group of questions and perform one of several operations on the selected group. Depending on the category of the marking operation, the procedure allows a user to identify a group to be marked or to manipulate a marked group in the manner listed.

MARKING OPERATIONS PSEUDOCODE

```
If <marked group identification operation>
  Case <operation type>
    "<(un)mark current question>"      <. . .>
    "<(un)mark all>"                   <. . .>
    "<invert marks>"                   <. . .>
    "<show/hide marks>"                <. . .>
    "<mark unanswered>"                <. . .>
    "<mark old answers>"               <. . .>
    "<mark new answers>"               <. . .>
    "<mark double checked>"            <. . .>
    "<mark tentative>"                 <. . .>
    "<mark untentative>"               <. . .>
    "<mark declined>"                  <. . .>
    "<mark blank>"                     <. . .>
    "<mark OK>"                        <. . .>
Else -- must be <marked group manipulation operation>
  Case <operation type>
    "<load answers/notes file>"        <. . .>
```

-continued

MARKING OPERATIONS PSEUDOCODE

```
    "<save answers/notes file>"        <. . .>
    "<clear answers/notes>"            <. . .>
    "<asked only marked questions>"    <. . .>
Return
```

D. The Integrated System

As described above, the major components of the computer-assisted decision management system are the authoring program 22, the applications 26 and the execution program 28. A unique feature of this invention is the division of programming labor among the components.

The execution program 28 is best described as a virtual processor, engineered on the model of a computer but implemented in software. The blocks and other data structures produced by an author are in effect the source code, compiled with the authoring program 22 into applications 26 which then run on the execution program 28.

The system divides the programming labor so that the author has maximum freedom in incorporating knowledge into the applications. But the author is not concerned with programming many ordinary aspects of a computer implementation usually required to be specified by an application author. The execution program 28, as a virtual processor, implements every aspect of an application that is not essential to the author's role as knowledge contribution. The result is that applications 26 are concise structures not complete applications in any conventional sense. An application has content, but a substantial portion of the application's behavior—the way it is displayed and reacts to user input—is contributed directly by the virtual processor and need not be programmed by the author.

Specifically, the application 26 contributes all the questions which may be asked during its execution and the rules which control what questions are asked, in what form, and in what order. The program logic of the application also determines text displayed to the user as questions, prompts, choice lists, tags, application advice and application context. The program logic further determines results provided.

The virtual processor contributes all screen, keyboard, mouse, file management actions and all controls necessary for the user to manage every aspect of the application's execution. The processor creates the different display environments including a central control panel, a question display, a spreadsheet display, a results display, etc. All string management is handled by the virtual processor as well as a full complement of file operations for reading and writing application, answer, notes, marks and results files. This includes the ability to select any file, directory or disk by picking choices from lists.

Finally, the virtual processor controls the execution of the application, which follows rules and logic specified in the application to govern the order and form of question presentation and the formulation of text for screen presentation and results.

Having described and illustrated the principles of the invention with reference to preferred embodiments and several variations thereon, it is apparent that such embodiments can be modified without departing from such principles. For example, many of the procedures herein may be rewritten and yet be equivalent in operation and function.

In view of these and the wide variety of other embodiments to which the principles of the invention can be applied, the illustrated embodiments should be considered exemplary only and not as limiting the scope of the invention. We therefore claim as the invention all such modifications as may come within the scope and spirit of the following claims and equivalents thereto.

We claim:

1. A computer-readable medium on which is stored a computer program for managing a presentation to a user of questions and answer choices, the program comprising:

instructions for generating a question for presentation to the user by executing a question procedure that includes a reference to another procedure that takes into account an answer given by the user to another question, the referenced procedure generating content literally different from but based on an analysis of one or more previous answers entered by the user, the referenced procedure providing the content to the question procedure for use in generating the presented question; and instructions for generating answer choices for the presented question for presentation to the user, whereby the instructions for generating questions and answer choices are repeated in response to answers entered by a user until all questions material to completing the presentation are asked and answered, taking into account answers given by the user in generating additional questions.

2. The computer-readable medium of claim 1 including instructions for directing the run-time generation of context-sensitive answer choices to the questions actually presented to the user at run time.

3. The computer-readable medium of claim 1 including instructions for directing the run-time generation of context-sensitive advice for assisting the user in understanding the actual run-time generated questions presented.

4. The computer-readable medium of claim 1 including instructions for directing the run-time generation of context-sensitive advice for assisting the user in making choices from the actual run-time generated answer choices presented.

5. The computer-readable medium of claim 1 including instructions for executing a pre-run-time determined sequence for the presentation of questions to the application's user and instructions for governing any run-time deviation from that sequence.

6. The computer-readable medium of claim 1 including instructions for generating a question sequence loop structure to manage the course of sequenced questions.

7. The computer-readable medium of claim 1 including instructions for generating a question sequence loop structure to manage suppression of sequenced questions or deviation from a pre-run-time determined course of sequenced questions.

8. The computer-readable medium of claim 1 including instructions for determining following questions, answer choices and advice based in part on the user's answer to a previous question.

9. The computer-readable medium of claim 1 including instructions for generating a main loop structure to handle requests by the user.

10. The computer-readable medium of claim 1 including an accumulated results data structure for storing the output of the execution.

11. The computer readable medium of claim 1 including instructions for executing conditional statement, loops, block references, assignments, or block terminations.

12. The computer readable medium of claim 1 including instructions for the selective retrieval and/or presentation to the user of an answer to a question.

13. The computer readable medium of claim 1 including instructions for the selective generation and/or presentation to the user of context-sensitive advice.

14. The computer readable medium of claim 1 including instructions for permitting a user to specify a question for current or later presentation.

15. The computer readable medium of claim 1 including instructions for permitting the user to specify attributes to be associated with an answer.

16. The computer readable medium of claim 1 including instructions for presenting to the user information regarding question names, question groupings, associated advice, current answers, answer status or answer attributes, or answer certainty levels.

17. The computer readable medium of claim 1 including instructions for permitting the user to navigate through the execution process using information regarding question names, question groupings, associated advice, current answers, answer status or answer attributes, or answer certainty levels.

18. A computer-readable medium on which is stored a computer program for assisting a user in completing a task, the program comprising:

instructions for generating a question for presentation to the user by making a reference in the question to a procedure that takes into account an answer given by the user to another question, the referenced procedure generating question content that is literally different from but based on an analysis of one or more previous answers given by the user;

instructions for generating answer choices for the presented question for presentation to the user, whereby the instructions for generating questions and answer choices are repeated in response to answers entered by a user until all questions material to completing the task are asked and answered, taking into account answers given by the user in generating additional questions.

19. A method for providing interaction between a computer and a user, the method comprising the following steps:

managing a dialog with a user, including presenting to the user questions and answer choices, storing and retrieving files to and from a file system, and scheduling an application program's executable components on a virtual processor;

executing on a virtual processor executable components of an application program including generating a question for presentation to the user by making a reference in the question to a procedure that takes into account an answer given by the user to another question, the referenced procedure generating question content that is literally different from but based on an analysis of one or more previous answers given by the user;

recording an answer given by the user to the presented questions for use in generating content for another question; and repeating the steps of generating questions and recording answers to complete the task, taking into account answers given by the user in generating additional questions.

20. A computer readable medium on which is stored a computer program containing instructions for executing the steps of claim 19.

* * * * *